(12) United States Patent
Speasl et al.

(10) Patent No.: US 11,501,483 B2
(45) Date of Patent: Nov. 15, 2022

(54) REMOVABLE SENSOR PAYLOAD SYSTEM FOR UNMANNED AERIAL VEHICLE PERFORMING MEDIA CAPTURE AND PROPERTY ANALYSIS

(71) Applicant: ImageKeeper LLC, Las Vegas, NV (US)

(72) Inventors: Jerry Speasl, Las Vegas, NV (US); Mike Patterson, Sherman, TX (US); Marc Roberts, St. Louis, MO (US)

(73) Assignee: ImageKeeper, LLC, Las Vegas, NV (US)

( * ) Notice: Subject to any disclaimer, the term of this patent is extended or adjusted under 35 U.S.C. 154(b) by 0 days.

(21) Appl. No.: 16/709,879

(22) Filed: Dec. 10, 2019

(65) Prior Publication Data

US 2020/0184706 A1 Jun. 11, 2020

Related U.S. Application Data

(60) Provisional application No. 62/777,405, filed on Dec. 10, 2018.

(51) Int. Cl.
| | |
|---|---|
| *G06T 17/00* | (2006.01) |
| *G06T 15/04* | (2011.01) |
| *G06T 7/00* | (2017.01) |
| *G06Q 50/16* | (2012.01) |
| *H04L 9/32* | (2006.01) |
| *H04L 9/14* | (2006.01) |
| *G06V 20/80* | (2022.01) |
| *G06V 20/00* | (2022.01) |

(52) U.S. Cl.
CPC ........... *G06T 15/04* (2013.01); *G06Q 50/163* (2013.01); *G06T 7/0002* (2013.01); *G06V 20/80* (2022.01); *H04L 9/14* (2013.01); *H04L 9/3242* (2013.01); *H04L 9/3247* (2013.01); *G06T 2207/10032* (2013.01); *G06V 20/95* (2022.01)

(58) Field of Classification Search
CPC ........ B64C 2201/123; B64C 2201/127; G06Q 40/08; G05D 1/0011; G05D 1/0094
See application file for complete search history.

(56) References Cited

U.S. PATENT DOCUMENTS

| | | |
|---|---|---|
| 6,675,386 B1 | 1/2004 | Hendricks et al. |
| 8,976,172 B2 | 3/2015 | Jones |
| 9,170,715 B1 | 10/2015 | Alini et al. |
| | (Continued) | |

OTHER PUBLICATIONS

U.S. Appl. No. 16/262,662 Office Action dated Jun. 19, 2020.
(Continued)

*Primary Examiner* — Weiming He
(74) *Attorney, Agent, or Firm* — Polsinelli LLP

(57) ABSTRACT

An unmanned aerial vehicle (UAV) may couple to a sensor payload device that includes cameras, radar, lidar, and/or other sensors. The UAV, coupled to the sensor payload device, may fly within the airspace of and/or around a property and capture images and/or sensor measurements of the property. The images and sensor measurements may be certified so that they may be verified as unaltered by viewers. A 3D representation of the property may be generated, and defects in the property may be detected by comparing the 3D representation to media depicting property defects. A report identifying the defects may be generated.

26 Claims, 11 Drawing Sheets

(56) References Cited

U.S. PATENT DOCUMENTS

| | | | |
|---|---|---|---|
| 10,134,092 | B1 | 11/2018 | Harvey et al. |
| 10,137,984 | B1 | 11/2018 | Flick |
| 10,176,527 | B1 | 1/2019 | Freeman et al. |
| 10,755,357 | B1 | 8/2020 | Davis et al. |
| 10,977,493 | B2 | 4/2021 | Speasl |
| 2004/0257444 | A1 | 12/2004 | Maruya et al. |
| 2009/0110267 | A1* | 4/2009 | Zakhor ............... G06T 15/04 |
| | | | 382/154 |
| 2009/0307255 | A1 | 12/2009 | Park |
| 2011/0103773 | A1 | 5/2011 | Johnson et al. |
| 2012/0179431 | A1 | 7/2012 | Labrie et al. |
| 2012/0268603 | A1 | 10/2012 | Sarna |
| 2013/0091432 | A1 | 4/2013 | Shet |
| 2014/0092244 | A1 | 4/2014 | Tang et al. |
| 2014/0380177 | A1 | 12/2014 | Gutermuth et al. |
| 2015/0145991 | A1 | 5/2015 | Russell et al. |
| 2015/0287214 | A1 | 10/2015 | O'Gorman et al. |
| 2016/0255282 | A1 | 9/2016 | Bostick et al. |
| 2017/0334559 | A1 | 11/2017 | Bouffard et al. |
| 2018/0069838 | A1 | 3/2018 | Lee et al. |
| 2018/0130196 | A1 | 5/2018 | Loveland et al. |
| 2018/0211115 | A1 | 7/2018 | Klein |
| 2018/0229833 | A1* | 8/2018 | Kimchi ............... B64C 25/26 |
| 2019/0050000 | A1 | 2/2019 | Kennedy et al. |
| 2019/0118945 | A1* | 4/2019 | Loveland ............ G05D 1/0202 |
| 2019/0236365 | A1 | 8/2019 | Speasl |
| 2019/0236732 | A1 | 8/2019 | Speasl |
| 2019/0373173 | A1* | 12/2019 | Wang ................. B64C 39/024 |
| 2019/0385269 | A1 | 12/2019 | Zachary |
| 2020/0142090 | A1* | 5/2020 | Colombo ................. G01V 3/16 |
| 2020/0182310 | A1* | 6/2020 | Rancourt .............. B64C 39/024 |
| 2020/0184706 | A1 | 6/2020 | Speasl |
| 2020/0207474 | A1* | 7/2020 | Foggia ................. G05D 1/0676 |
| 2021/0224539 | A1 | 7/2021 | Speasl |

OTHER PUBLICATIONS

3 Examples Of Why Modular UAS Payloads Are The Future, Feb. 6, 2017, Featured Articles (https://uasweekly.com/category/featured-articles/) | Mapping and Surveying, 6 pages.

"AeroVironment RQ-14 Dragon Eye/Swift", Directory of U.S. Military Rockets and Missiles, Appendix 2: Modern UAVS, Jul. 25, 2007. 4 pages.

"AeroVironment's VAPOR Helicopter Drones Offer Endless Possibilities", drone life, posted by Miriam McNabb, Nov. 8, 2019. 2 pages.

St. Louis Army COE Accepts Delivery of their First Unmanned Aircraft System—CRUSER—NPS Wiki, Created by Unknown User (wdplace) on Oct. 1, 2014. 1 page. http://www.amerisurv.com/content/view/13105/.

Garfinkel et al., Practical UNIX & Internet Security, 6.5 Message Digests and Digital Signatures, Apr. 1996, 2nd Edition, Chapter 6 Cryptography.

2010 SOLIDWORKS Help—Measure, Dassault Systemes, Measurement (Year: 2010).

U.S. Appl. No. 16/262,708 Office Action dated Mar. 3, 2021.

U.S. Appl. No. 16/262,708 Final Office Action dated Jul. 20, 2021.

U.S. Appl. No. 16/262,708 Office Action dated Jun. 13, 2022.

* cited by examiner

REMOVABLE SENSOR PAYLOAD SYSTEM FOR UNMANNED AERIAL VEHICLE PERFORMING MEDIA CAPTURE AND PROPERTY ANALYSIS

CROSS-REFERENCE TO RELATED APPLICATION

The present application claims the priority benefit of U.S. provisional application No. 62/777,405 filed Dec. 10, 2018, the disclosure of which is incorporated herein by reference.

BACKGROUND

Field of the Technology

The subject technology generally relates to property analysis and unmanned aerial vehicle (UAV) management. More specifically, the subject technology relates to generation of property analysis reports based on media collected via unmanned aerial vehicles (UAVs) and/or removably UAV-coupled sensor-laden UAV payloads.

Description of the Related Art

An unmanned aerial vehicle (UAV) is a flying device that does not require an onboard pilot, and is typically piloted by remote control, autonomously, or some combination thereof. UAVs may include cameras. In recent years, UAVs have become increasingly affordable and popular, in part due to the proliferation of smaller, more powerful, more energy-efficient, and more affordable computers, cameras, and other electronic components.

UAVs are also sometimes referred to as "drones," though in some cases the term "drone" may refer to a subset of UAVs that can be operated out of eyeshot of an operator and beyond line of sight. The term "drone" as used herein refers to any type of UAV, rather than this subset of UAVs or any other subset of UAVs.

Property surveying, property analysis, and property management are traditionally labor-intensive and time intensive processes that demand numerous precise measurements, sometimes over relatively large areas. These processes traditionally involve numerous measurements of a property and/or one or more structures on the property. These processes are used heavily during and before construction of structures on property, for property insurance surveying, for property maintenance, for due diligence for property sales and mortgages, for forensics, and for property boundary mapping and disputes. Over time, various technologies have developed to make measurements more accurately and reliably, such as theodolites, laser rangefinders, global positioning system (GPS) receivers, and other devices. These devices traditionally require trained professionals to properly set up the devices, and to review data from the devices. These devices often need to be positioned very precisely, and sometimes cannot be used in certain areas by human operators because a certain position might not be human-reachable, such as inside a narrow air duct or outside of a high floor of a tall building.

There is a need for improved UAV management systems for use of UAVs in property analysis situations.

DETAILED DESCRIPTION

An unmanned aerial vehicle (UAV) may couple to a sensor payload device that includes cameras, radar, lidar, and/or other sensors. The UAV, coupled to the sensor payload device, may fly within the airspace of and/or around a property and capture images and/or sensor measurements of the property. The images and sensor measurements may be certified so that they may be verified as unaltered by viewers. A 3D representation of the property may be generated, and defects in the property may be detected by comparing the 3D representation to media depicting property defects. A report identifying the defects may be generated.

Technologies and processes are discussed for generating property analyses based on media recorded from a sensor-laden payload device held in payload by an unmanned aerial vehicle (UAV). The payload device records media data using one or more cameras and/or other sensors as well as geo-spatial data (such as locations) via positioning sensors and other sensors. Media data may include geospatial data, images, videos, audio, IR, laser rangefinder data, GNSS data, LIDAR data, RADAR data, SONAR data, accelerometer data, gyroscope data, or data from any other sensor discussed herein. The media data and geospatial data may be first verified as genuine via a media certification process and then used to generate a 3D representation of at least part of a property, such as a building. The generated 3D representation may be wireframe only or may include textures layered upon wireframe, the textures generated from the images or video as well. Defects in the building, such as in the roof of the building, may be identified using the generated 3D representation, for example by comparing portions of the generated 3D representation to media with examples of known defects, for example by comparing portions of the generated 3D representation against a database that includes images of defective roofs/walls and/or 3D representations of defective roofs/walls. The defects identified in generated 3D representation may be compiled into a generated report along with one or more locations from the geospatial data and optionally some of the original media data. The generated report, as well as the generated 3D representation and the media and geospatial data, may be maintained at a cloud-based server for viewing, authorized editing, and subsequent distribution.

Figure 1A:
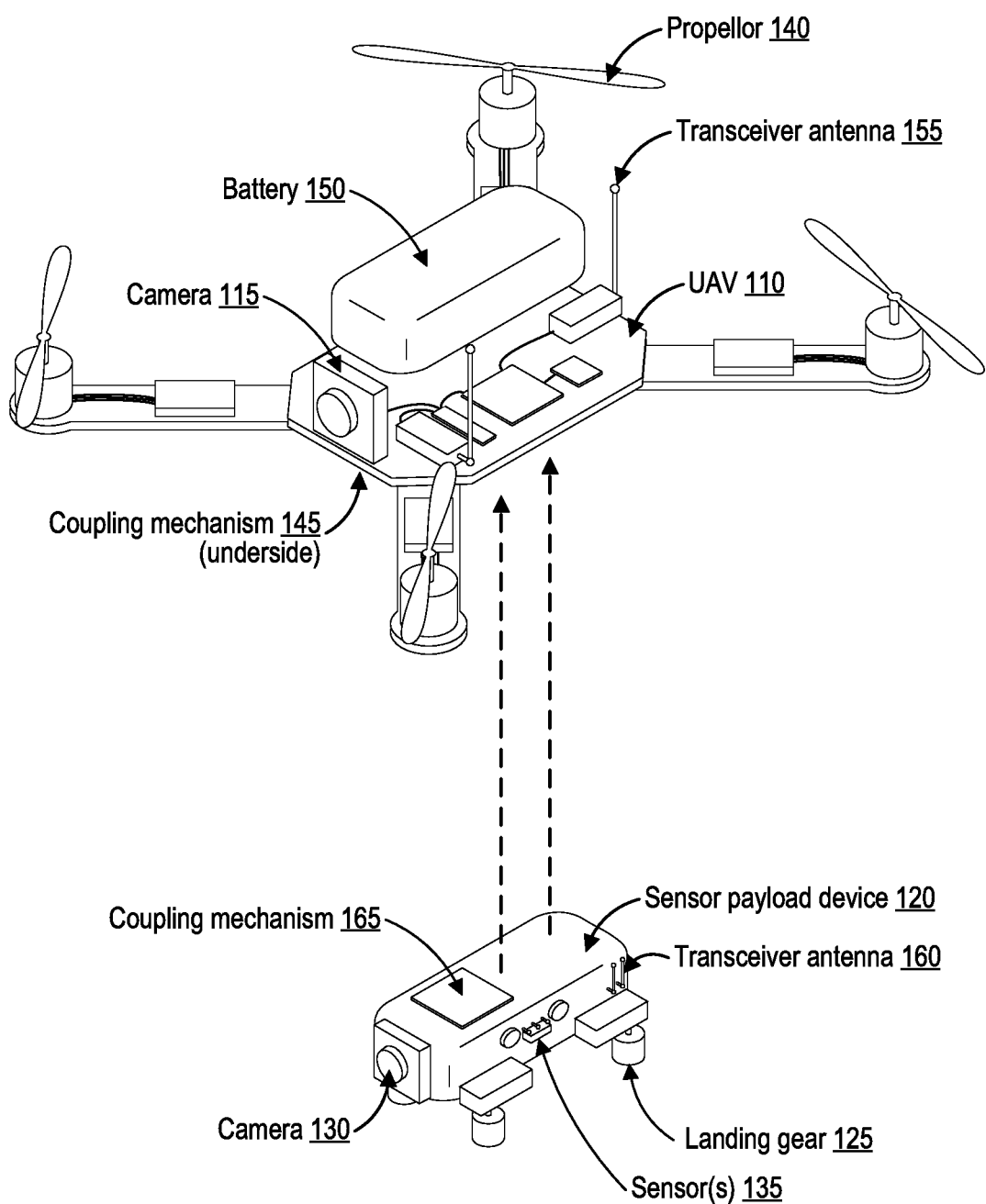
FIG. 1A illustrates an unmanned aerial vehicle (UAV) and a sensor payload device that can be coupled to the UAV.

FIG. 1A illustrates an unmanned aerial vehicle (UAV) and a sensor payload device that can be coupled to the UAV.

The diagram 100 of FIG. 1 illustrates an unmanned aerial vehicle (UAV) 110 and a sensor payload device 120 in an uncoupled state. The UAV 110 illustrated includes four motorized propellers 140, one or more batteries 150, one or more wireless communication transceivers with one or more transceiver antennae 155, a camera 115, and one or more coupling mechanism(s) 145 that can be coupled to one or more coupling mechanism(s) 165 of the sensor payload device 120. While a certain combination of components is illustrated in the UAV 110 of the diagram 100, it should be understood that another type of UAV 110 may be coupled to, and used with, the sensor payload device 120. For instance, a UAV 110 may be used that is missing certain components of the UAV 110 illustrated in the diagram 100, that includes additional components not illustrated in the diagram 110, or some combination thereof.

The sensor payload device 120 illustrated in the diagram 100 includes a variety of components. More specifically, the sensor payload device 120 includes one or more camera(s) 130, one or more sensor(s) 135, one or more wireless communication transceivers with one or more transceiver antennae 160, a landing gear 125, and one or more coupling mechanism(s) 165 that can be coupled to the one or more coupling mechanism(s) 145 of the UAV 110. The one or more camera(s) 130 and one or more sensors(s) 135 may include a variety of types of cameras and sensors as discussed further herein. While a certain combination of components is illustrated in the sensor payload device 120 of the diagram 100, it should be understood that another type of sensor payload device 120 may be coupled to, and used with, the UAV 110. For instance, a sensor payload device 120 may be used that is missing certain components of the sensor payload device 120 illustrated in the diagram 100, that includes additional components not illustrated in the diagram 110, or some combination thereof.

In some cases, different sensor payload devices 120 may include different combinations of camera(s) 130 and/or sensors(s) 135. Some camera(s) 130 and/or sensors(s) 135 may be particularly heavy, so by spreading such heavy components across different sensor payload devices 120, different sensor payload devices 120 may be coupled to a particular UAV 110 at different times for different tasks without overburdening the UAV 110 with an extremely heavy payload. In some cases, the sensor payload device 120 may be modular, so that certain components, such as camera(s) 130 and/or sensors(s) 135, may be swapped for other components between flights of the UAV 110.

The coupling mechanism(s) 145 of the UAV 110 and the coupling mechanism(s) 165 of the sensor payload device 120 may be any type of mechanisms that allow the UAV 110 and the sensor payload device 120 to be coupled. In some cases, the coupling mechanism(s) 145 and 165 may allow the UAV 110 and the sensor payload device 120 to be coupled in a removable fashion, while in other cases, the UAV 110 and the sensor payload device 120 may be coupled permanently or semi-permanently. For example, the coupling mechanism(s) 145 and 165 may include one or more screws, nails, bolts, washers, nuts, anchors, staples, buckles, brackets, carabiners, chains, claws, arms, ropes, wires, cables, straps, hook-and-loop fasteners, touch fasteners, other mechanical fasteners, ferromagnets, electromagnets, other magnetic coupling mechanisms, pressure-sensitive adhesives, structural adhesives, thermosetting adhesives, tapes, other adhesives, or some combination thereof. Multiple coupling mechanism(s) 145 may be included on or otherwise as part of the UAV 110. Likewise, multiple coupling mechanism(s) 165 may be included on or otherwise as part of the sensor payload device 120.

In some cases, the UAV 110 may be coupled to the sensor payload device 120 via one or more grabbing mechanisms, which may include, claws, arms, pinchers, or fingers of the UAV 110 that the UAV 110 may actuate to pick up and/or hold on to the sensor payload device 120. In some cases, the UAV 110 may then release the sensor payload device 120, for example to pick up a different sensor payload device 120. A UAV 110 with one or more grabbing mechanisms may be able to actuate these grabbing mechanism autonomously, and thus may switch one sensor payload device 120 for another sensor payload device 120 on the fly during a mission in order to best accomplish an objective.

In some cases, the coupling mechanism(s) 145 and/or 165 may include wired and/or wireless electrical coupling components, such as ports, plugs, jacks, wires, electrical contact pads, capacitive connectors, inductive connectors, wireless transceiver(s), or some combination thereof. In such cases, one or more computing devices, camera(s), and/or sensor(s) onboard the UAV 110 may receive data from and/or transmit data to one or more computing devices, camera(s), and/or sensor(s) onboard the sensor payload device 120. The UAV 110 may then process and/or transmit its own data combined with data from the sensor payload device 120. Alternately, the sensor payload device 120 may process and/or transmit its own data combined with data from the UAV 110.

In some cases, the electrical coupling components may additionally or alternatively transfer electrical power from the UAV 110 to the sensor payload device 120, or from the sensor payload device 120 to the UAV 110. For example, the electrical coupling components may transfer power from the one or more batteries 150 of the UAV 110 to the sensor payload device 120, for example to charge one or more batteries (not pictured) of the sensor payload device 120 and/or to power the various components of the sensor payload device 120 directly. The electrical coupling components may transfer power from the one or more batteries (not pictured) of the sensor payload device 120 to charge the one or more batteries 150 of the UAV 110 and/or to power the various components of the UAV 110 directly.

Figure 1B:
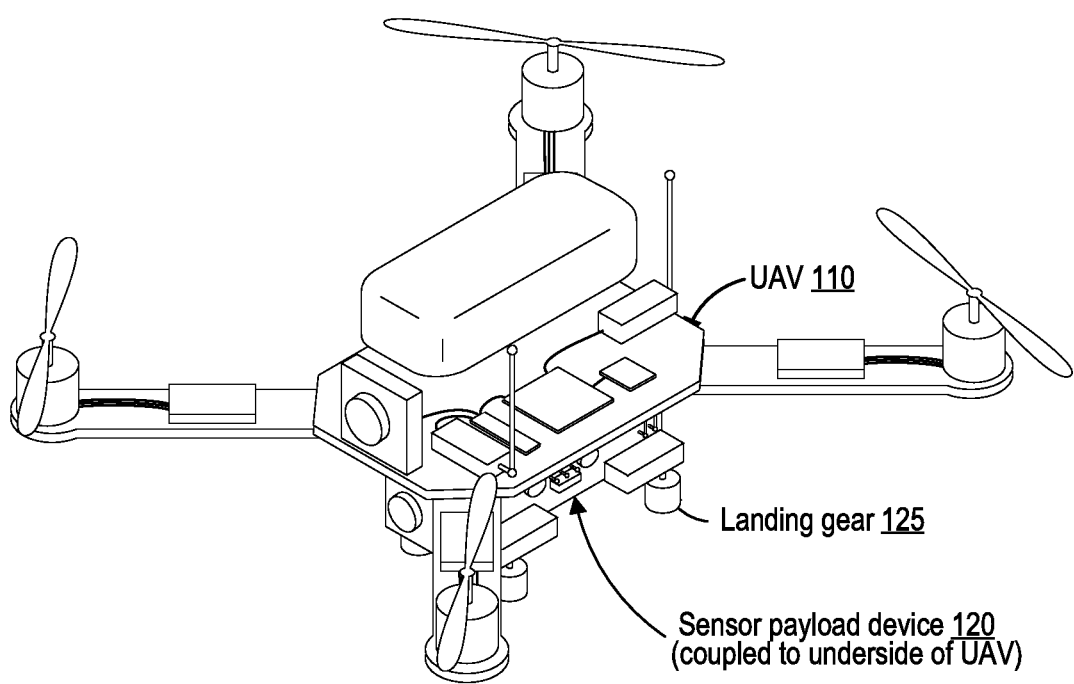
FIG. 1B illustrates the UAV and the sensor payload device of FIG. 1B coupled to one another.

FIG. 1B illustrates the UAV and the sensor payload device of FIG. 1B coupled to one another.

The UAV 110 and the sensor payload device 120 are coupled to one another in the diagram 190 of FIG. 1B. While the sensor payload device 120 is coupled to the underside of the UAV 110 in the diagram 180, in other cases the sensor payload device 120 may instead or additionally be coupled to the top and/or to any side of a UAV 110. In some cases, multiple sensor payload devices 120 may be coupled to the UAV 110 on different sides of the UAV 110. In some cases, one or more sensor payload devices 120 may be coupled to another sensor payload device 120 that in turn is coupled to the UAV 110, allowing the UAV 110 to the coupled to a collection of sensor payload devices 120 arranged in a stack, a planar grid, a three-dimensional lattice, another layout, or some combination thereof.

Because the sensor payload device 120 of the diagram 180 is coupled to the underside of the UAV 110, it may be difficult for the UAV 110 to land normally using the landing gear or other landing mechanism(s) that the UAV 110 might otherwise be able to use. As a result, the sensor payload device 120 includes its own landing gear 125, which may be permanently extended into a landing position. In some cases, the landing gear 125 may be motorized and actuated to extend in preparation for landing and/or retract after or during takeoff, either in response to signals received by the sensor payload device 120 from the UAV 110 or automatically by the sensor payload device 120. The sensor payload device 120 may automatically extend or retract the landing gear 125 based on sensor feedback from one or more sensors of the sensor payload device 120, such as from one or more GNSS receivers, accelerometers, gyroscopes, range sensors, or some combination thereof.

Figure 2:
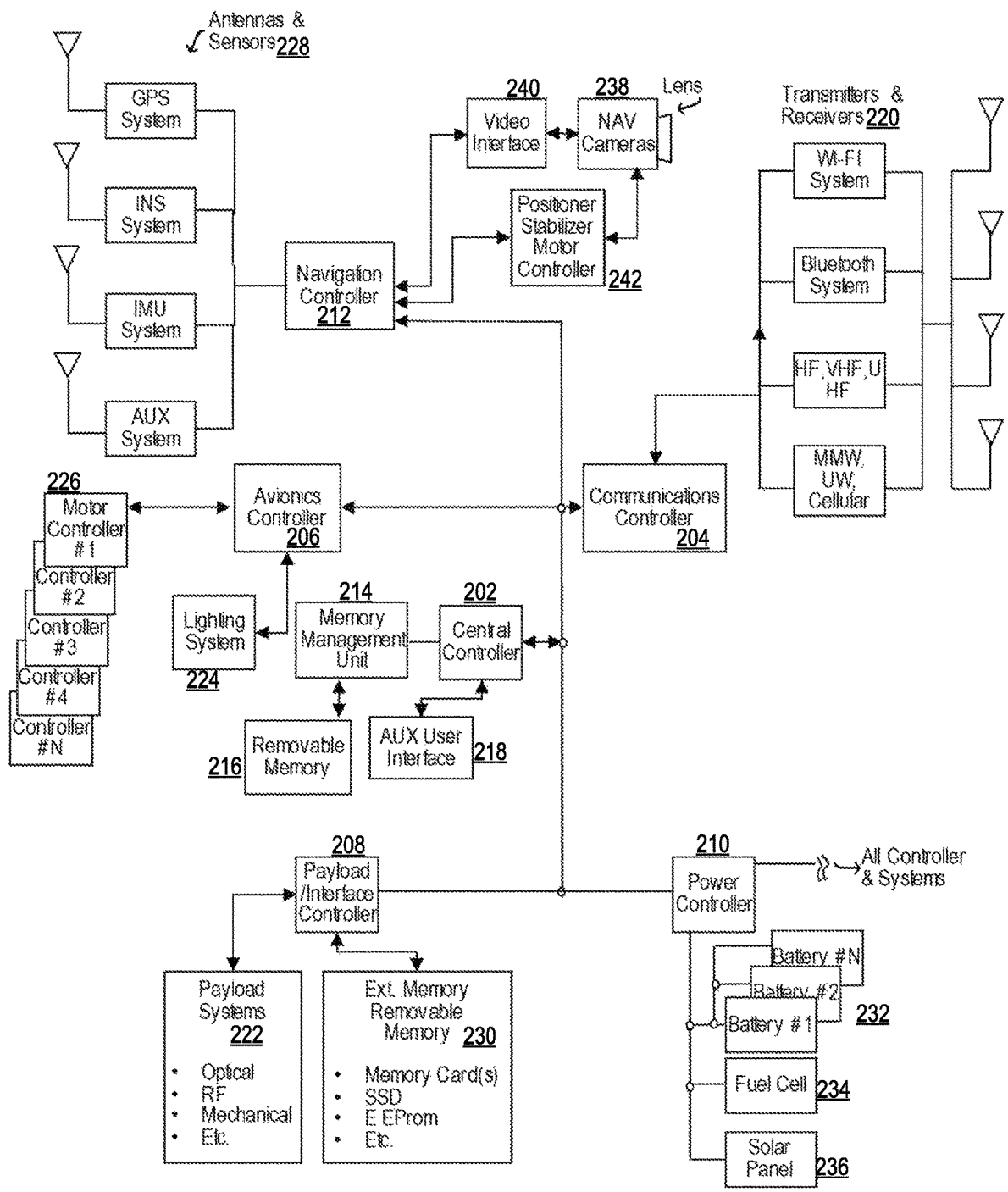
FIG. 2 is a block diagram illustrating a system architecture of the sensor payload device.

FIG. 2 is a block diagram illustrating a system architecture of the sensor payload device.

The diagram 200 of FIG. 2 illustrates various components that may be present in the sensor payload device 120, the UAV 110, or some combination thereof. The sensor payload device 120 and/or UAV 110 may include: a Central Controller 202, Communications Controller 204, Avionics Controller 206, Payload/Interface Controller 208, Power Controller 210, and Navigation Controller 212. While numerous combinations/substitutions are possible with this technology, several core elements are shown and discussed further. These, too, may be optional or substituted, but are typically more important. It should be noted that the lines interconnecting the major elements represent bi-directional data, address, control and power lines (hereafter referred to as the "System Bus").

The Central Controller 202 may have a multi-core architecture allowing performance efficiencies associated with parallel computing. Multiple configurations are possible, such as a single computer with multiple cores or multiple computers each with multiple cores. Further, the technology is not dependent on a brand or proprietary architecture. Accordingly, the technology is agnostic regarding the operating system selection and be dependent on the processor brand chosen. Memory Management Unit 214, under control of Central Controller 202 manages the efficient caching, buffering, storage and retrieval of data. It is scalable and flexible, capable of managing a system requiring no more than a few megabytes to thousands of Terabytes, regardless if it's a rotary, optical, or solid state memory configuration. In some cases, solid state memory is the configuration of choice due to low latency access and retrieval times and power consumption. Removable Memory 216, under control of the Memory Management Unit 214, needs to be sufficiently large to accommodate working off-line, i.e., not connected to a base station 410/415, so that all working files and data are readily available during each mission. The memories can be replaced periodically when software updates demand or dictate. Alternate embodiments may include Electrically-Erasable Program Only Memories (EEPROMS), that can programmed either "on-the 'fly" by the MMU 214 or at a support facility on the ground and configured with either static or dynamic Random Access Memories (RAM). It should be obvious to those schooled in the art that numerous configurations may support the spirit and scope of the technology. An Auxiliary User Interface 218 is available for maintenance and service operations.

The Communications Controller 204 provides the interface to all data communications between a base station 410/415 and UAV 110 and/or sensor payload device 120. In some cases, radio data links are supported both by power and interface circuitry to the System Bus, interfacing directly with Transmitter/Receivers (Transceivers) 220. Navigation, Control, UAV and/or sensor payload device Status, and sensor data is passed through the transceivers 220, each tuned by the base station 410/415 to a dedicated Transceiver at the base station 410/415 during a mission. Data is cached and buffered within the Communications Controller 101 and transmitted to/from the Central Controller 202. UAV Payload 222 sensor data can also be sent to the Payload/Interface Controller 208 to the Communications Controller 204 while the UAV is still flying or has landed. Alternately, a memory card (SD/XD/USB/ etc.) can be extracted from the UAV via 230.

The Avionics Controller 206 manages the interface between the Central Controller 202, Navigation Controller 212, and the rotor and/or sensor-actuating Motor Controllers 226 and lighting System 224. Specific mission flight tracks initiated by the base station 410/415, and loaded into the Central Controller 202 and stored in memory, is executed by sending specific commands to the Avionics Controller 206 and receiving navigation feedback from the antennas and sensors 228, which may include but are not limited to global positioning system (GPS) or other GNSS receiver(s), an inertial navigation system (INS), an internal measurement unit (IMU), and/or other auxiliary (AUX) System via Navigation Controller 212. Changes or updates to flight tracks during an ongoing mission is sent from the base station 410/415 and received by the Communications Controller 204, and sent to the Central Controller 202 with subsequent commands to the Avionics Controller 206.

The Payload/Interface Controller 208 serves as a basic Input/output (I/O) Interface to the UAV System Bus. It is anticipated that Payload Systems 222 may be either: self-contained with their own computing ecosystem or; reliant on the UAV Central Controller 202 to execute specific mission programs—either configuration is within the scope of the technology. Optionally, a high resolution (e.g., 4K) video/still camera with zoom may be mounted on a motor controlled, stabilized gimbal with daylight, UV and IR capabilities is anticipated. Data captured by the Payload System 222 is stored and accessible for removal via 230.

The Power Controller 210 provides power to the entire UAV. In some cases, the Power Controller 210 can be connected to multiple rechargeable batteries 232 or a chemical Fuel Cell 234, or a Solar Panel 236 that can trickle-charge the rechargeable batteries 232. During ground operations, the Power Controller 210 can be directly connected to the a Power Transfer Module of a base station 410/415 via the UAV Launch/Retrieval Mechanism, which may be an automated hydraulic system. System checks are performed under software execution via Central Controller 202 to ensure that power is sufficient prior and during flight operations.

The Navigation Controller 212 provides power and data interface for the GPS System, Inertial Navigation System, Inertial Motion Unit, other Auxiliary Systems, Navigation Camera 238, Navigation Camera Video Interface 240, and Navigation Camera Positioner Stabilizer Motor Controller 242. The Navigation Controller 212 provides position feedback for the flight track executed by the Central Controller 202. Specific GPS position information can be transmitted in real-time to a base station 410/415 via the Communications Controller 204 to facilitate Real-Time Kinematic (RTK) precision measurement. The Navigation Camera (1051) facilitates manual Man-In-The-Loop flying and allows the UAV operator to fly visually. The Positioner Stabilizer Motor Controller (1053) allows the camera to be positioned for optimum visual field during flight operation.

Figure 3:
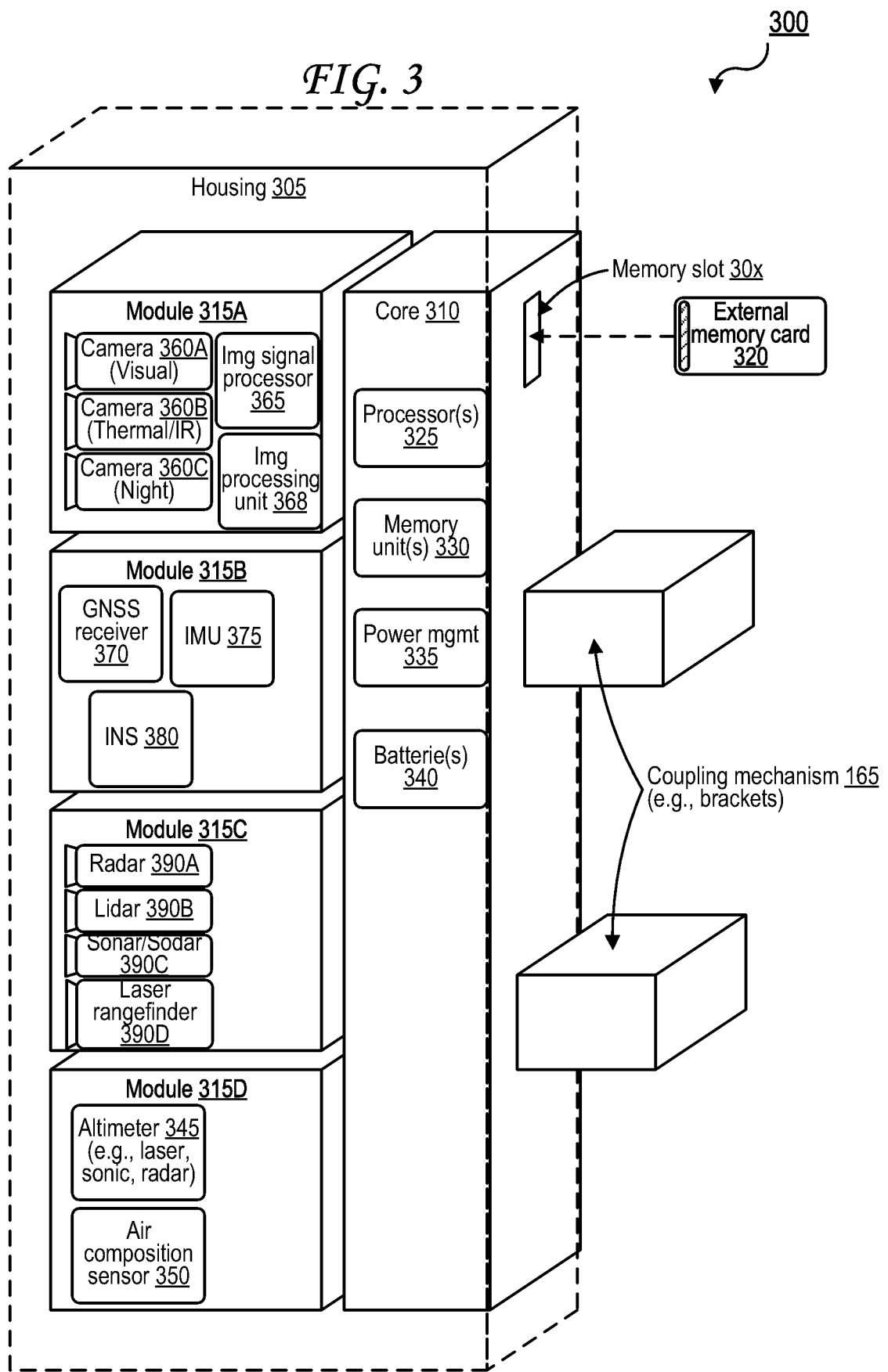
FIG. 3 illustrates a modular sensor payload device.

FIG. 3 illustrates a modular sensor payload device.

The modular sensor payload device 120 of the diagram 300 of FIG. 3 includes a housing 305. The housing 305 includes a core 310 that remains and is not able to be switched or replaced. The housing also includes four modules 315A-D, each of which coupled to the core 310 and/or to one another, and which may be removed and/or replaced with other modules to allow the modular sensor payload device 120 to perform different functions. Two brackets that may be part of the coupling mechanism 165 are illustrated as part of the housing 305. While four modules 315A-D are illustrated as coupled to the core 310 and within the housing, it should be understood that more or fewer modules may be used. In some cases, the sensor payload device 120 may not be modular at all. That is, the sensor payload device 120 only includes a core 310 and all of the components illustrated in the diagram 300 are part of the core 310. Alternately, the sensor payload device 120 may lack a core 310 and may be entirely modular, and all of the components illustrated in the diagram 300 may be part of one or more of the various modules 315A-D.

A number of components are illustrated as part of the core 310 and as part of each of the various modules 315A-D. It should be understood that, while some of these components are illustrated in the core 310 and others in certain modules 305, it should be understood that each component may be in any one of the core 310 and/or one or more of the modules 305A-D.

The core 310 includes one or more processors 325, memory units 330, power management systems 335, and batteries 340. The core 310 also includes a memory slot that receives an external memory card 320 or other external memory or non-transitory machine-readable storage medium/device. The module 315A includes a visual camera 360A, a thermal/infrared(IR) camera 360B, and a night vision camera 360C. The module 315A includes an image signal processor 365, which may include a digital signal processor (DSP) and/or analog signal processor (ASP). The module 315A includes an image processing unit (IPU), which may perform tasks such as panoramic stitching, even up to 360 degrees.

The module 315B includes a GNSS receiver 370, an IMU 375, and an INS 380. These sensors may include various individual movement sensors, such as accelerometers and gyroscopes.

The module 315C includes distance/range sensors, including a radar sensor 390A (e.g., synthetic aperture radar), a lidar sensor 390B, and a sonar and/or sodar sensor 390C, and a laser rangefinder 390D. The cameras 360A-C and distance/range sensors may be articulated using a 3-axis gimble, which may be motorized and actuated.

The module 315D includes an altimeter 345, such as a laser altimeter or sonic/ultrasonic altimeter or radar altimeter. The module 315D includes an air composition and/or quality sensor 350.

Other sensors may be included in the sensor payload device 120 that are not illustrated as components of the sensor payload device 120 in the diagram 300. For example, the sensor payload device 120 may include one or more theodolites, as thermometers, barometers, humidity sensors, environmental sensors, other sensors may be included as well. The sensors may capture photos, visual, radar, thermal, multispectral, dual band, multi band cameras and LIDAR data, roof area measurements, pitch, perimeter measurements, shingle/tile/slate/concrete types using predetermined business rules, process hail/wind damage estimation and then in real-time produce and generate while still in flight and in post-production a report and claim estimate and transmit a finalized claim estimate and report to the adjuster firm or insurance company, independent of a human intervention robotically.

Figure 4:
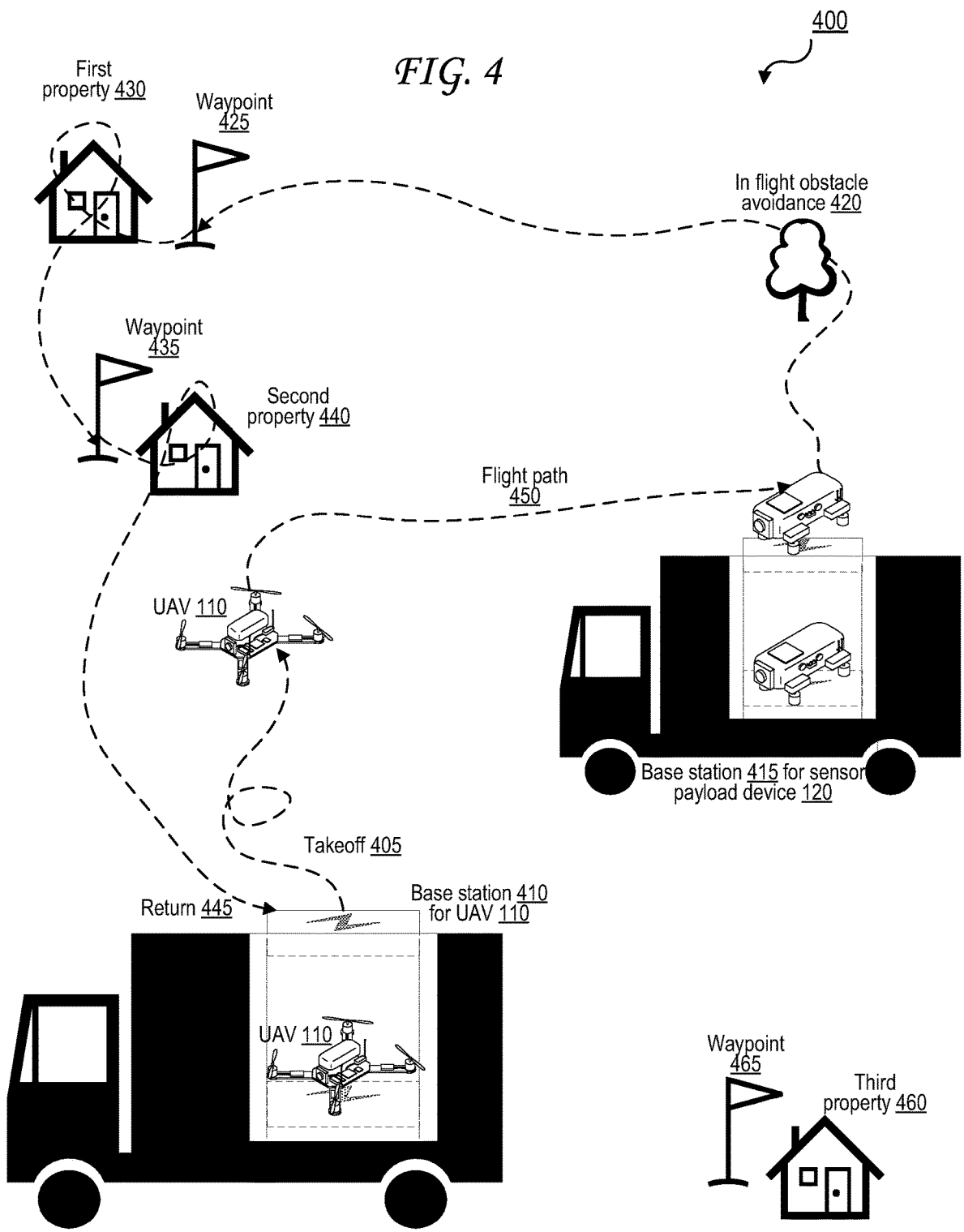
FIG. 4 illustrates a flight path of an unmanned aerial vehicle (UAV) that retrieves a sensor payload device and collects analysis data for two properties.

FIG. 4 illustrates a flight path of an unmanned aerial vehicle (UAV) that retrieves a sensor payload device and collects analysis data for two properties.

The diagram 400 of FIG. 4 illustrates a flight path 450 of a UAV 110. A base station 410 charges and/or replaces a battery of the UAV 110. The base station 410 may in some cases receive mission objectives from a user device and/or supply the mission objectives to the UAV 110, for example to retrieve a sensor payload device 120 and fly about a first property 430 near a first waypoint 425 and a second property 440 near a second waypoint 430 so that the sensor payload device 120 can capture images and/or other sensor measurement data about the first property 430 and the second property 440 before returning. The UAV 110 then takes off 405 and flies a flight path 450 until its return 445. The UAV 110's flight about the flight path 450 may be autonomous, remote-controlled, or semi-autonomous (e.g., autonomous in between predetermined checkpoints and/or waypoints).

The UAV 110 may fly to a second base station 415 to retrieve the sensor payload device 120. The second base station 415 may likewise charge and/or replace a battery of the sensor payload device 120. The base station 415 may in some cases receive mission objectives from a user device and/or supply the mission objectives to sensor payload device 120, for example to connect to the UAV 110 and to gather capture images and/or other sensor measurement data about the first property 430 and the second property 440 while the UAV 110 flies around the first property 430 and the second property 440, then to process the captured images and/or other sensor measurement data. The sensor payload device 120 may be automatically coupled to the UAV 110 when the UAV 110 reaches (e.g., comes within at least a predefined range of) the base station 415 and/or the sensor payload device 120, for example by mechanisms of the UAV 110 and/or by the base station 415 and/or by the sensor payload device 120. These mechanisms may in some cases include one or more robotic arms. The UAV 110 coupled to the sensor payload device 120 may take off again and depart the base station 415. The base stations 410 and 415 are illustrated as land vehicles, and specifically trucks, that may house and shelter the UAV 110 and sensor payload device 120, respectively, when not in use. The base stations 410 and 415 may take other forms, such as aquatic vehicles (e.g., boats), aerial vehicles (e.g., airplanes or helicopters or other UAVs), or stationary stations.

Along its flight path 450, the UAV 110 may engage in in-flight obstacle avoidance to avoid an obstacle, which in the diagram 400 is illustrated as a tree. In some cases, the UAV 110 may use data gathered by one or more sensors of the sensor payload device 120 to identify the obstacle and maneuver around the obstacle. The UAV 110 may fly the flight path 450 to a predetermined waypoint 425 near a first property 430. The UAV 110 may perform a flight path about the first property 430 while the sensor payload device 120 captures images and/or other sensor data (e.g., radar, lidar, sonar and/or data gathered by any sensor of the sensor payload device 120) of the first property 430. The UAV 110 may then fly the flight path 450 to a predetermined waypoint 435 near a second property 440. The UAV 110 may perform a flight path about the second property 440 while the sensor payload device 120 captures images and/or other sensor data (e.g., radar, lidar, sonar and/or data gathered by any sensor of the sensor payload device 120) of the second property 440. An example flight path about a property 515 is illustrated in FIG. 5A.

The UAV 110 may then continue its flight path 450 to return 445 to the base station 410. While not illustrated the UAV 110 may also fly back to the base station 415 to drop off the sensor payload device 120. In some cases, either the base station 410, the base station 415, or both may retrieve data from the UAV 110, the sensor payload device 120, and/or both, and may perform any of the processes discussed further with respect to FIG. 5B, FIG. 6, FIG. 7, or FIG. 8. The base station 410 may recharge and/or replace a battery of the UAV 110 and/or the sensor payload device 120 (if still coupled to the UAV 110) after the UAV 110 lands. The base station 415 may recharge and/or replace a battery of the sensor payload device 120 after the UAV 110 drops the sensor payload device 120 off at the base station 415.

A third waypoint 465 corresponding to a third property 460 are also illustrated in the diagram 400. However, because the third waypoint 465 and the third property 460 are far away from the first and second waypoints and properties (e.g., more than a threshold distance), the FIG. 5A illustrates a flight path about a property by an unmanned aerial vehicle (UAV) that is coupled to a sensor payload device and that collects analysis data about the property along the flight path.

Figure 5A:
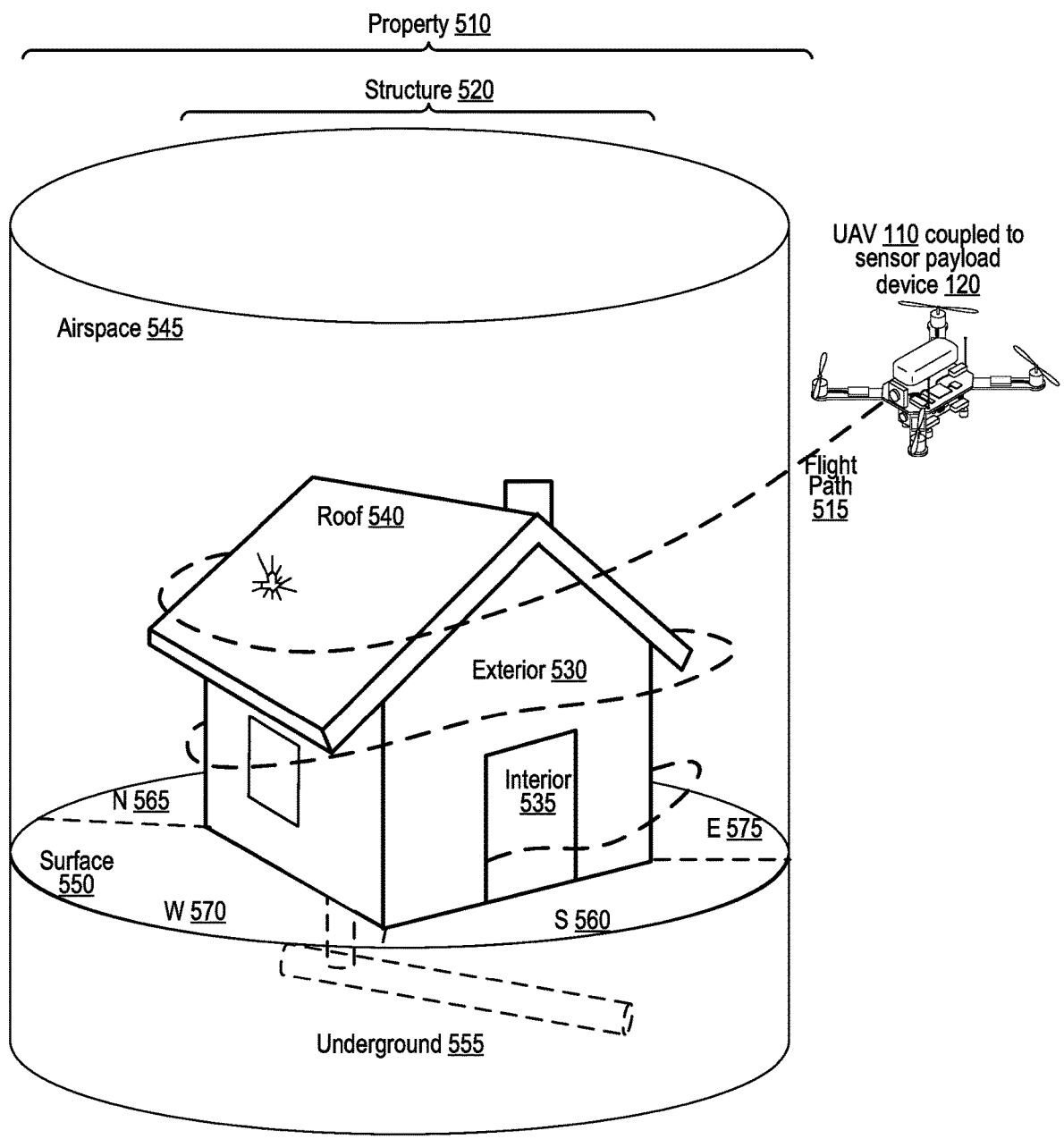
FIG. 5A illustrates a flight path about a property by an unmanned aerial vehicle (UAV) that is coupled to a sensor payload device and that collects analysis data about the property along the flight path.

The diagram 500 of FIG. 5A illustrates a property 510 that includes a structure 520 with an exterior 530, an interior 535, and a roof 540 (which may be considered part of the exterior 530). The property 510 also includes a ground surface 550 upon which the structure 520 is built, an underground volume 555 underneath the surface 550, and an airspace 545 over the surface 550 of the property 510.

The property 510 of FIG. 5A is divided into areas, including a south side 560, a north side 565, a west side 570, and an east side 575. These areas are defined in FIG. 5A by boundaries illustrated using dotted lines across the surface 550, but may also extend below into the underground volume 555 below the surface 550 and airspace volume 545 above the surface 550. Though the lines are only illustrated outside the exterior 530 of the structure 520, they may also extend into the interior 535 of the structure 520.

Figure 5B:
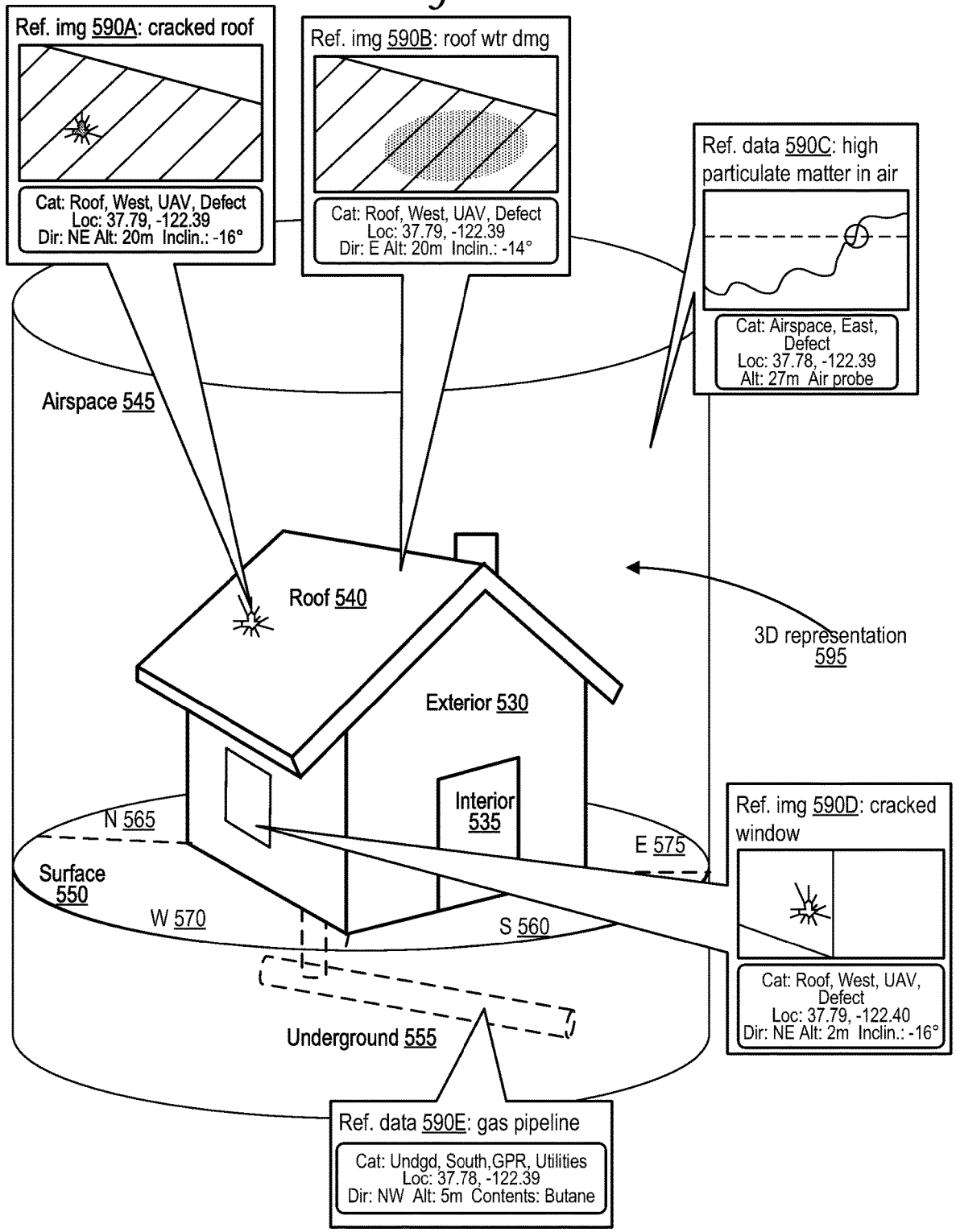
FIG. 5B illustrates a three-dimensional representation of the property of FIG. 5A generated based on the analysis data collected by the sensor payload device along the flight path.

These areas 560, 565, 570, and 575 may correspond to location-based categories for various digital media assets, such as images, audio, and videos, captured about the property 510 as illustrated in and discussed further with respect to FIG. 5B, and may be generated automatically after capture of at least a subset of the digital media assets based on the locations of those captures as identified in metadata associated with those captures. For example, the four areas 560, 565, 570, and 575 of FIG. 5A may be defined automatically so that each area includes the same number of digital media captures, or a similar number (e.g., a range from one number to another number or a range around a particular number).

The UAV 110 coupled to the sensor payload device 120 travels along a path 585 about the property 510. In some cases, the UAV 110 may be replaced with an unmanned ground vehicle (UGV), which may likewise be coupled to the sensor payload device 120 and may drive or walk about the surface 550 of the property 510. Though no body of water (or any other liquid) is explicitly illustrated within the property 510 illustrated in FIG. 5A, it should be understood that such a body of water may exist within a property 510, and in such cases, the UAV 110 may instead be an unmanned surface vehicle (USV) coupled to the sensor payload device 120, the USV swimming across liquid surfaces (e.g., of bodies of water). A USV coupled to the sensor payload device 120 may be used to capture digital media assets about the liquid body, as may unmanned underwater vehicles (UUV) that can swim below the surfaces of volumes of liquid (e.g., underwater). Thus, any reference to the UAV 110 herein should be assumed to alternately include a UGV, USV, and/or UUV.

The UAV 110 and the sensor payload device 120 collect digital media data through various sensors of the UAV 110 and/or the sensor payload device 120 at different locations along the path 515 about the property 510 that includes at least one structure 520. The UAV 110 flies a path 515 through the airspace 545 of the property 510 about the exterior 530 of the structure 520 (including about the roof 540), over the surface 550 and eventually into the interior 535 of the structure, optionally including a basement and/or attic. Along the way, the UAV $$$ and/or the sensor payload device 120 captures digital media assets, such as photos, videos, audio recordings, air quality tests, RADAR images, SONAR image, LIDAR images, and other sensor measurements at many locations along its path 515 using an array of sensors of the UAV $$$. The path 515 of the UAV 110 may also enter the interior 535 of the structure 520 after going around the structure 520, optionally including a basement and/or attic. Once the UAV 110 is in the interior 535 the structure 520, the UAV 110 may traverse the interior, the UAV 110 and sensor payload device 120 may capture digital media assets, and may optionally map or model a virtual layout of the interior 535 as well as the exterior 530.

FIG. 5B illustrates a three-dimensional representation of the property of FIG. 5A generated based on the analysis data collected by the sensor payload device along the flight path.

The diagram 598 of FIG. 5B illustrates a 3D model representation 595 of the property 510, the 3D model representation 595 generated based on images and/or other sensor data along with corresponding locations at which those images and/or other sensor data were captured by the UAV 110 and/or coupled sensor payload device 120. The 3D model representation 595 of the property 510 includes a number of callout boxes 590A-D with reference media assets captured by the UAV 110 and/or coupled sensor payload device 120 while the UAV 110 flew about the flight path 515.

In particular, reference 590A is a reference image 590A identifying damage to the roof 140. Capture data associated with the reference image 590A shows it was captured at latitude/longitude coordinates (37.79, −122.39), that the sensor of the digital media capture device was facing north-east at the time of capture (more precise heading angle data may be used instead), that the capture device was at an altitude of 20 meters when this image 590A was captured, and that the inclination of the capture device's sensor was −16 degrees at capture. The image 590A has been automatically filed into the "roof" location-based category since the photo is of the roof 140, the "west" location-based category since the photo is in the west side area 170, the "UAV" device-based category since the photo was captured by a camera of the UAV 105, and the "defect" subject-based category since a subject of the photo is a defect (the crack in the roof).

A second reference 590B is a reference image 590B identifying water damage to the roof 140. Capture data associated with the reference image 590B shows it was captured at latitude/longitude coordinates (37.79, −122.39), that the sensor of the digital media capture device was facing east at the time of capture (more precise heading angle data may be used instead), that the capture device was at an altitude of 20 meters when this image 590B was captured, and that the inclination of the capture device's sensor was −14 degrees at capture. The image 590B has been automatically filed into the "roof" location-based category since the photo is of the roof 540, the "west" location-based category since the photo is in the west side area 570, the "UAV" device-based category since the photo was captured by a camera of the UAV 110, and the "defect" subject-based category since a subject of the photo is a defect (the water damage on the roof).

A third reference 590C is reference data 590C identifying a high amount of particulate matter in the airspace 545. Capture data associated with the reference data 590C shows it was captured at latitude/longitude coordinates (37.78, −122.39) and that the air quality (particulate matter) sensor of the sensor payload device 120 was at an altitude of 20 meters when this data 590C was captured/measured using the air quality sensor. The data 590C has been automatically filed into the "airspace" location-based category since the data is a measurement of the air in the airspace 545, the "east" location-based category since the data was captured in the east side area 575, and the "defect" subject-based category since a subject of the data is a defect (air pollution).

A fourth reference 590D is reference data 590D identifying a cracked window visible at the exterior 530 of the structure 520. Capture data associated with the reference data 590D shows it was captured at latitude/longitude coordinates (37.79, −122.40) and that the sensor of the digital media capture device was at an altitude of 2 meters when this data 590D was captured/measured.

A fifth reference 590E is reference data 590E identifying the existence of a gas pipeline underground 155, which may have been detected by a ground-penetrating radar (GPR) of the sensor payload device 120. Capture data associated with the reference data 590E shows the data was captured at latitude/longitude coordinates (37.78, −122.39), that the pipeline extends in the northwest direction, and that the sensor payload device was at an altitude of 5 meters above the location where the pipeline was detected, The data 590E also indicates that the gas pipeline contains butane. The data 590E has been automatically filed into the "underground" location-based category since the data corresponds to pipeline that is underground 155, the "south" location-based category since the data was captured in the south side area 160, the "GPR" category identifying the sensor type that was used, and the "utilities" subject-based category since a subject of the data is a utility (gas pipeline).

The defects and other data identified in the reference images 590A-E may have been detected based on comparison of the relevant portion in the 3D model representation 595 (and/or images and/or other sensor data captured by the UAV 110 and/or sensor payload device 120) with 3D models or images of known defects of this type. 3D models may be computer assisted design (CAD) models, and textures may be generated and applied to the 3D models based on images captured by the cameras.

Other types of defects and/or damage may also be detected, identified, and/or reported. For example, the UAV 110 and/or the sensor payload device 120 may identify, based on captured media from its various sensors, damage from hail, rain, wind, ice, snow, frost, impact, lightning, or some combination thereof. Property boundaries may be detected, as well as Other reference data or reference media not illustrated in FIG. 5B may nonetheless also be included. For instance, reference data may identify expected or observed air traffic patterns through and around the airspace 545, or at and around the nearest airport to the property 510, and/or expected or observed audio levels resulting from such air traffic. Reference data may identify expected or observed smoke or smog or other air pollution measured in the airspace 545, for example in the form of an air quality index (AQI) or air quality health index (AQHI) or particulate matter (PM) index, which may be caused by nearby sources of pollution, such as airports, factories, refineries, vehicles, streets, highways, landfills, wildlife, and the like. Reference data may identify expected or observed smells or odors in the property 545, for example due to any of the sources of pollution discussed above in or near the property 510. Reference data may identify expected or observed levels of carbon dioxide and/or of asbestos brake lining dust in highway corridors. Reference data may identify expected or observed levels of pollen, dander, or other common biological and synthetic allergens and irritants. Reference data may identify expected or observed levels of flu or other illnesses in or around the property 510. Reference data may identify an expected or observed ultraviolet index (UVI) identifying danger from the sun's ultraviolet (UV) rays in or around the property 510. Reference data may identify expected or observed levels of rainfall, expected or observed levels of humidity, expected or observed dew point, expected or observed visibility levels, expected or observed air pressure, and other expected or observed environmental parameter levels. Reference data may identify presence of underground or above-ground power lines, transmission lines, transformers, generators, power plants, wind turbines, wind turbine farms, solar panels, or other electrical equipment, or effects of such items, such as radiation, pollution, wind turbine rotor noise, or wind turbine visual shadow flicker irritation. Reference data may identify presence of underground or above-ground cable lines, internet data lines, fiber optic data lines, broadband lines, or other data line equipment.

The digital media assets may include, for example, photos or videos from cameras, range measurements or range point clouds (e.g., range "images" or range "videos") from a range sensor, media and/or measurements captured by any other sensor discussed herein, or combinations thereof.

The system may use surveyed fiduciary boundary markers as key location identification points, or other data such as third-party GIS system input to locate the property. This data may be input into the flight planning system along with elevation data, terrain and the object avoidance sensors in multiple direction to insure there is no collision in the path, if someone suddenly put a bus in the path, the drone may locate it with sensors and avoid it all together by taking avoidance paths. The system may integrate third party road data, and 3D road models utilized for autonomous autos for use to fly above the roadway on the way to and from the job. All other FAA mandated airspace requirements, airports, television (TV) towers, cell towers may be avoided as no-fly zones and identified as geographic hazards to the drone and may form a no-fly zone or a GPS geo fence to insure safe flight to and from the property.

The UAV 110 and sensor payload device 120 may collect, process and distribute data between multiple cloud sources and onboard resident stored data sets, stored and data collected by the UAV 110 and sensor payload device 120. The system may utilize artificial intelligence processing, comparison, image recognition and image processing technology to identify multiple types of damages in the media captured by the UAV 110 and sensor payload device 120 system. It may also generate a detailed measurement of the damaged area as a percentage of the total area and store that information with the media identification number so that it can be called upon later in software processing to be inserted into reports if selected. In addition, it may also generate a scale of damage associated with the areas identified in the geospatial certified media. The system may utilize this data to generate visual graphic renderings for report integration.

Damage may be identified and have a rating based on the severity such as low being a 1 and 8 being severe, and a 10 being replace the entire roof. The system may process simultaneously while on-site and in flight in a self-contained analysis, estimating, and reporting generation system. The sensor payload device 120 may be modular and expandable and may be is coupled/attached to a UAV or drone using aerospace brackets and coupling for quick attachment and removal. The assessment UAV 110 and sensor payload device 120 system is a completely self-sufficient system. It captures certified geospatial media driven by user defined mission requirements and autonomous flight operation with a safety initial approach fix waypoints established by the system users to insure safety of flight paths. The IAF (initial approach fix/waypoint (Safe Route) is established to insure safety of operation and that no human, object or property may be at risk during while in route or during or returning from the property roof assessment which is being performed.

These technologies may provide a perceptively computer managed sensor payload device 120 camera captured media, intelligently combined with CAD and building guideline data to create centimeter accurate GPS drawings, which create 3D/2D structure measurements integrated into CAD software along with GPS property, parcel, property boundaries, U. S. Geological survey fiduciary benchmarks along with structure and building corner identification locations. The system may ingest sensor payload device 120 captured digital media including centimeter GPS/IMU/INS 3D coordinates into CAD software and create 3D/2D electronic images that are digitally rendered using the electronic media and with either direct roof and damage overlays and integrated CAD/media along with their associated metadata files and referenced Media ID's.

It may isolate and estimate damage location details with severity using rectified intelligence and computer processing, inspection data, structure roof facet detail with facet compass directionality. The sensor payload device 120 computer system is networked via communications and cloud systems. The sensor payload device 120 system can draw from any of these data sources that may be required to complete an analysis of a property structure. Examples of some of the data the system may reach out and integrate into the report from other live databases include pitch measurement processing, material costs, material types, installation instructions, underlayment requirements, such as felt, plywood types etc., hardware such as roof jacks, roofing seals, vents, gutter, eves treatments etc.

In some cases, the UAV 110 and sensor payload device 120 can capture media by standoff of each roof pitch identified and process the image data to determine the pitch of the roof structure. This data is then made available to the other measurement processing used in the overall system to create the cost estimates. The camera captures the image and the image processor then determines the roof pitch by using the image and measure the roof angles in the image to determine and create the roof pitch measurement.

The UAV 110 and sensor payload device 120 may have certain programmed touch points (preprogramed or otherwise programmed) on a roof to produce precision elevation measurements of the roof with centimeter accuracy in three dimensions. The elevation measurement combined with the angle, math formulas may produce the pitch angle of any surface the aero system lands or touches/probes with any extensions during the mission. If for example the mission is to determine the exact height of the roof and every facet, top, roof peak, eaves, edges, then the system can be programmed to follow the flight plan to perform any number of touch points in x, y, or z of the roof, sides, of house edges of gutter, walls of the structure, or items associated with the roof such as chimneys, skylights, solar panels, etc.

The mission and flight plans and updates are electronically transmitted to and continually updated to the UAV/ drone and are reconfigurable and may include multiple UAV operating simultaneously both on serial missions to multi-properties or different properties as UAV platform power supplies allows. The flight plans pre-select the GPS information, elevation data, GPS location of the property to be assessed. To insure the accuracy of the GPS data, both differential GPS corrections, L1 and L5 signals are integrated into the flight planning process as well as RTK (Real Time Kinematic) correction data. The UAV processor system locates, defines damage types, severity and uses industry damage comparison models to determine damage down to the shingle grain, color, texture, types, dent width, depth etc., on each shingles, identifies, calculates the material types and replacement values and integrates the data into the onboard computer system in real-time and the system transmits the final reports and estimates to the users.

Utilizing these systems may allow hail damage reports, estimates, claims to be submitted electronically faster for quicker settlements into insurance settlement system for adjuster firms, 3rd party claim evaluators and insurance companies. Advanced UAV's can fly autonomously and robotically to/from using computerized flight plans created for specific waypoints/addresses/GPS fixes. By interacting with these systems one can create a flight plan to perform a specific detailed mission. To insure the safety of people and infrastructure, one these plans must include elevation features such as trees, power lines, newly erected structures, or other things that might be in the path of the mission. Some drones now have obstacle avoidance technology which is useful in supporting the mission.

Figure 6:
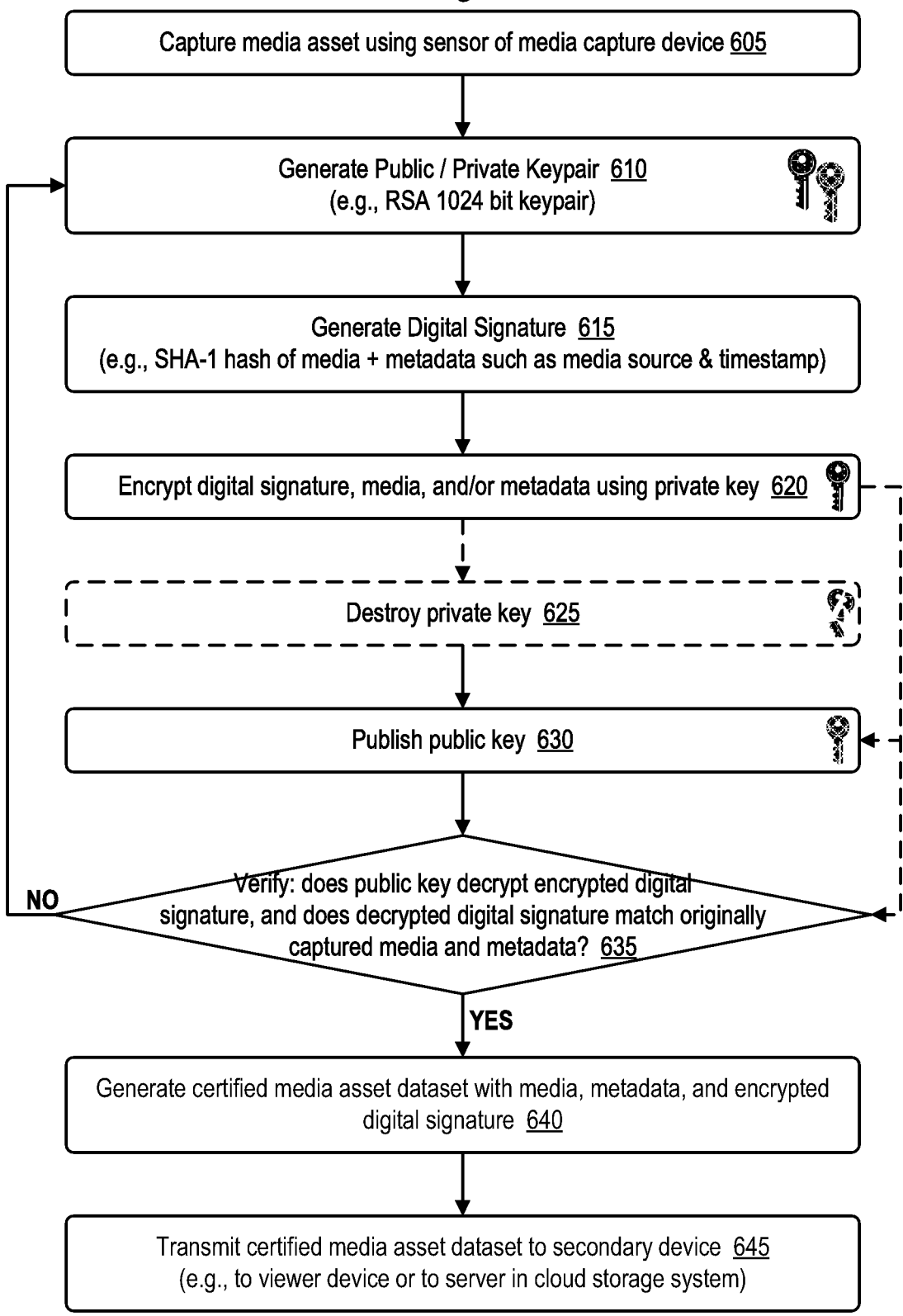
FIG. 6 is a flow diagram illustrating techniques for media certification.

FIG. 6 is a flow diagram illustrating techniques for media certification.

At step 605, a media asset is captured by a sensor of a media capture device, optionally with its metadata as well. The metadata may include, for example, latitude and longitude coordinates from a GNSS receiver or other positioning receiver, an identification of the media capture device, a timestamp identifying date and time of capture, an altitude at capture, a heading at capture, an inclination at capture, a yaw at capture, a roll at capture, pitch at capture, a watermark, an annotation, any other data that might be found in image EXIF metadata, elevation or altitude, velocity at capture, path, speed, direction, distance, weather conditions, barometer reading & change, dew point, humidity, sun angle, temperature, compass heading, media certification status, annotation certification status, incident note certifications status, incident report certification status, event number, time, date, time zone, title, media type (IR, multi-spectrum, lidar, UV, 2-dimensionality, 3-dimensionality), wind speed, wind direction, radar data, cloud coverage, visibility, flood data, any other metadata discussed herein, or combinations thereof.

At step 610, an asymmetric public key infrastructure (PKI) key pair—with a private key and a corresponding public key—is generated by the media capture device of step 605 or by server 115. In some cases, the keys of the key par may be RSA 1024 asymmetric keys. Other types of asymmetric keys may be used.

At step 615, a digital signature is computed by generating a hash digest—optionally using a secure hash algorithm such as SHA-0, SHA-1, SHA-2, or SHA-3—of the captured media, and optionally of the metadata as well. At step 620, the digital signature is encrypted with the private key. The media and/or metadata may also be encrypted using the private key. The private key is optionally destroyed at step 625, or may simply never be written to non-volatile memory in the first place.

At step 630, the public key is published, either by sending it to the servers 115, to an authentication server such as a certificate authority, or by otherwise sending it for publication in another publicly accessible and trusted network location. At step 635, verification as to the authenticity of the media and metadata may occur by decrypting the encrypted digital signature using the public key before or after publication at step 630, and verifying whether or not the hash digest stored as part of the decrypted digital signature matches a newly generated hash digest of the media. If the new hash matches the hash decrypted using the public key, then verification is successful, and the media asset has not been modified since capture (or at least since certification). If the new hash does not match the hash decrypted using the public key, then verification is unsuccessful, and the media asset has been modified since capture (or at least since certification). The same can be done using the metadata if a hash digest of the metadata is included in the digital signature. The verification as to the authenticity of the media and metadata at step 635 may also include decrypting the media asset and/or the metadata itself, if either or both were encrypted at step 620. This verification may occur at the digital media capture device—though it may instead or additionally be performed at the server 115, for example before the server 115 indexes the media as part of a cloud storage system accessible by client devices 120.

Assuming the authentication of step 635 was successful, a certified media dataset is generated by bundling the media, metadata, and the encrypted digital signature, for example in a zip file or other compressed archive file. The public key may also be bundled with them, though additional security may be provided by publishing it elsewhere to a trusted authentication server. At step 645, the certified media dataset (and optionally the public key) is transmitted to a secondary device, such as a server 725 or a viewer device (i.e., a client device 730).

In some cases, additional data besides the media asset and associated metadata may also be certified, either or separately from the media asset or together with the certification of the media asset. If the additional data is certified together with the media asset, the hash and digital signatures at step 615 may be hashes of the media asset as well as the additional data, thereby certifying the media asset along with the additional data. If the additional data is certified separately from the media asset, the entire process 700 may be repeated, with the additional data treated as a media asset. Additional data may include alterations or annotations to a media asset, or at least a subset of a report that is generated based on the media asset, or at least a subset of a report that is generated to include the media asset. Metadata corresponding to the additional data in some cases identifying one or more author(s) of the additional data and/or one or more devices on which the additional data was generated and/or certified, and/or from which the additional data was submitted to the server(s) 725. In some cases, a certain media asset can be associated with multiple additional data items, such as multiple notes, annotations, and/or reports by different authors, the same authors, or some combination thereof.

In other words, the operations 600 of FIG. 6 illustrate data integrity precautions that can be taken. For example, all data (e.g., media asset and/or additional data and/or metadata) can, in some embodiments, be secured in a local database with a globally unique identifier to ensure its integrity. The asset's security and integrity can be ensured via a Digital Signature that is made up of a SHA1 digest, the time that the asset was captured and the device of origin. This allows the mobile app or server to detect changes due to storage or transmission errors as well as any attempt to manipulate or change the content of the asset. The Digital Signature can be encrypted with a public/private key-pair that is generated uniquely for that asset by the media capture device. The private key can be destroyed by the media capture device and/or never written to a disk or stored in a memory of the media capture device or any other device; as such, this ensures that the asset cannot be re-signed and cannot be changed without those changes being detectable.

More specifically, media asset data, such as image, video, audio, 3D distance measurements, or other sensor data are captured by a camera, microphone, and/or other sensors integrated with the sensor payload device 120 and/or sensors connected to the sensor payload device 120 in a wired or wireless manner. The sensor payload device 120 also generates and/or extracts metadata (e.g., EXIF metadata) corresponding to this captured media asset, for example identifying the sensor payload device 120 and/or the UAV 110, a timestamp of capture, a date of capture, an author or owner of the sensor payload device 120 and/or UAV 110, and any other metadata. A digital signature is generated by generating a hash of both the captured media and at least some of this metadata. For example, the digital signature may be a hash of the captured media, the timestamp, and an identifier of the sensor payload device 120 and/or UAV 110 that captured the media. The hash may be computed using a secure hash algorithm (SHA), such as SHA-0, SHA-1, SHA-2, or SHA-3. The sensor payload device 120 and/or UAV 110 and/or a second device that receives the media asset from the sensor payload device 120 and/or UAV 110 may then generate a public and private key pair using a public key infrastructure (PKI), where the keys may be for example RSA 1024 bit keys. The private key is used to encrypt the digital signature, and may then be deleted, erased, and/or destroyed, in some cases via overwriting for more security. The certified media asset—meaning the media asset, the encrypted digital signature, and the (optionally encrypted) metadata—are uploaded to the cloud severs 725, in some cases along with the public key, optionally securely via HTTPS or another secure network transfer protocol. The public key may be uploaded to the same cloud server(s) 725 or to a different system, such as a certificate authority (CA) server. The media asset and its metadata are now certified. Any server 725 or client 730 can retrieve the public key from the cloud server 725 system or CA server and decrypt the encrypted digital signature to verify that it matches a new hash generated using media asset and/or metadata at a later time, thereby verifying that the media asset and metadata have not been changed since certification. The same certification process may be used for additional data based on the media asset, such as annotations, notes, and reports. In some cases, such a verification check is performed at the media capture device or second device before the media asset and metadata and encrypted digital signature and public key are sent by the media capture device or second device to the server(s) 725. In some cases, such a verification check is performed at the server(s) 725 after receipt of the certified media asset.

Metadata may include, for example, time, location, media capture, orientation, media size, resolution, frame size, elevations, centimeter 3D GPS position, UAV speed, flight path over the property with media overlap settings, heading, airspeed, and various navigational invomation from the UAV 110 and/or from the sensor payload device 120.

Figure 7:
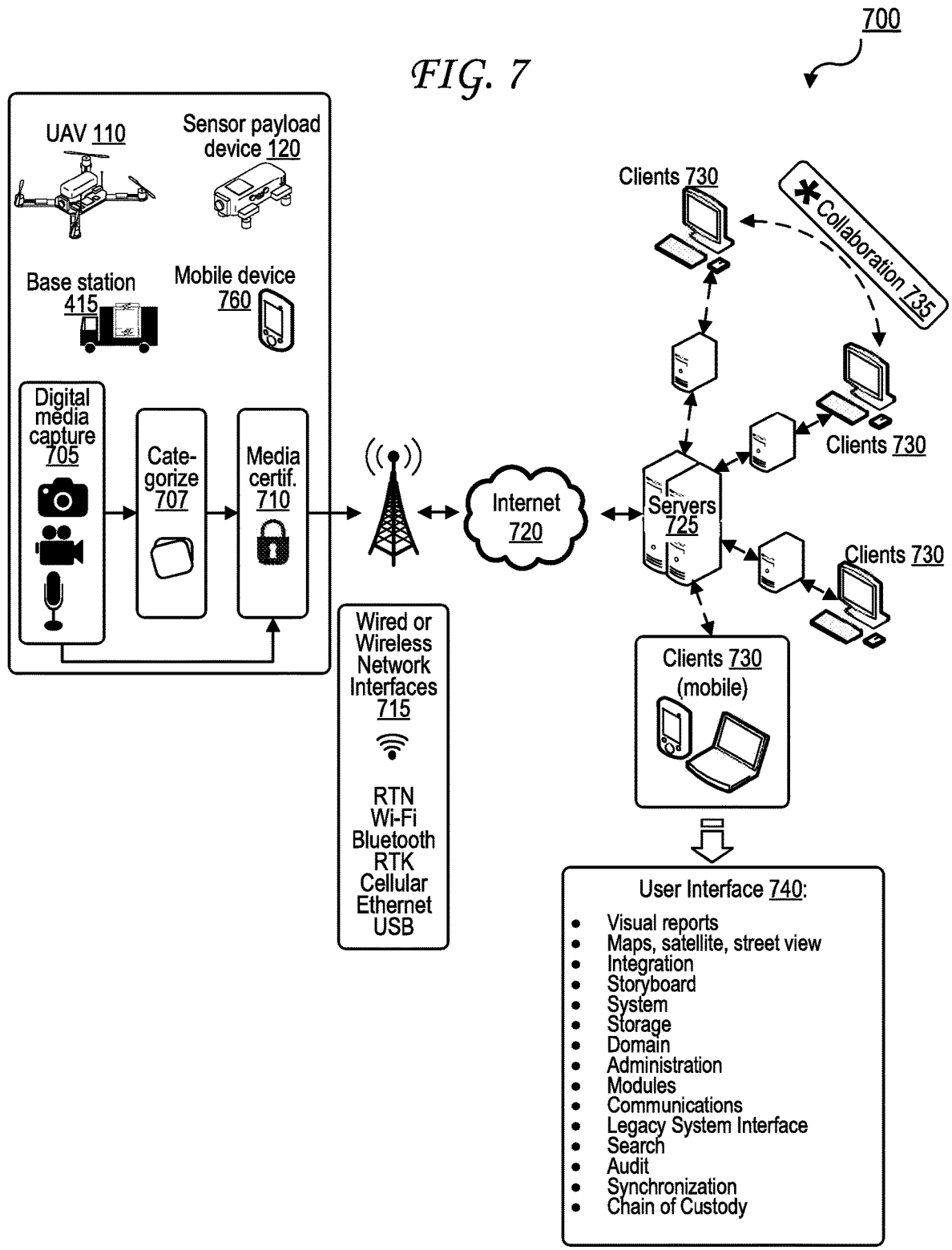
FIG. 7 illustrates a network architecture through which digital media may be captured, certified, uploaded to a server network, verified, and distributed to clients.

FIG. 7 illustrates a network architecture through which digital media may be captured, certified, uploaded to a server network, verified, and distributed to clients.

The diagram 700 illustrates a process that begins at a step 705, at with a digital media capture device captures digital media, which may include one or more image(s), video(s), sensor data, or a combination thereof. The digital media capture device 705 may be part of the UAV 110, the sensor payload device 120, a user mobile 760, a base station 410/415 or a combination thereof. The image and/or sensor data may be categorized at a step 707 (e.g., for example based on type of media, time, location, other metadata associated with capture of the digital media, or some combination thereof) and/or certified at a step 710 (e.g., as in the process 600 of FIG. 6). Categorization 707 and/or certification 710 may occur at the UAV 110, the sensor payload device 120, the user mobile 760, the base station 410/415, or a combination thereof. In some cases, categorization 707 may be skipped.

Once digital media is captured at the digital media capture device at step 705, categorized at step 707, and/or certified at step 710, the certified (and in some cases categorized) digital media data may be autonomously sent to one or more servers 725 by the digital media capture device or a second device that receives the digital media data from the digital media capture device. The second device may be the UAV 110, the sensor payload device 120, a user mobile 760, a base station 410/415 or a combination thereof. The digital media capture device and/or the second device transmits the certified (and in some cases categorized) digital media data to the servers 725 over the internet 720 using one or more wired and/or wireless network interfaces 715, which may include cellular networks (e.g., 3G, 4G, LTE, or 5G), W-Fi, wireless local area networks (WLAN), any other wired and/or wireless network interfaces discussed herein, or a combination thereof.

Once the certified digital media data is received by the servers 725, the servers 725 store, verify, file, organize, and publish the certified digital media data so that the certified digital media data is made accessible through the internet 720 to client devices 730. The servers 725 may receive the public key transmitted at step 645 of the process 600 and use the public key to verify that the certified digital media data is authentic and unaltered.

In some cases, the digital media capture device can first synchronize its image and/or sensor data with a second device, such as a mobile device 760 and/or a base station 410/415. For example, a camera of a UAV 110 or sensor payload device 120 may first synchronize its data with a user mobile device 760 (e.g., a smartphone or wearable device) or a base station 410/415, which can then transmit the certified digital media to the internet 720 and server(s) 725 of the cloud system. Other devices, such as handheld digital cameras, body cameras, and binoculars may include the digital media capture device, and/or in some cases may connect with the server(s) 725.

The internet/cloud system can include one or more server systems, which may be connected to each other. In one embodiment, this internet/cloud system is a wireless multiplexed system for securely storing digital data to and from mobile digital devices. In another embodiment, the digital data (e.g., images, reports) are securely held in one central place, either by a hardware memory device, server, or a data center.

Once the data is in the internet/cloud system, it may be accessible through a web portal. This web portal may include image-editing tools, worldwide access, and collaboration mechanisms available to its users. Security, digital signature, electronic signatures, watermarking, encryption physical access, password credentials area can be utilized throughout the system. Original digital data can be confirmed, saved and protected though various technologies and system controls. The data can be further sent to other data systems such as one or more distributed ledgers (e.g., one or more blockchain ledgers) for other downstream uses. The certified data remains unchanged and in its original condition within the distributed ledger, and mechanisms within the distributed ledger may further ensure that anyone with access to the distributed ledger can verify authenticity. For example, each block of a blockchain distributed ledger may include a hash of the previous block, or a hash of the previous header, which, can be verified by a viewer re-computing the hash for any particular block and checking it against the hash stored in the next block. In some cases, blocks of a blockchain can also include a Merkle Root that represents a hash of hashes of the entire ledger up until (and optionally cases including) the block in question, which can be verified in a similar way. In some embodiments, certain media certification and other data integrity precautions can be taken as discussed with respect to the process 600 of FIG. 6.

All the reports and estimates can be reviewed in the web portal system view. They can be modified, organized, searched, revisited, edited, changed as needed, prioritized, synchronized with the UAV 110 and sensor payload device 120 system, preserved, sent, printed, distributed, shared, emailed, secured, revised with incremental software updates, revised with labor or material data bases, hosted on website for third party subscription, integrated with other systems integrally and externally through APS's.

When completed, multi media reports/estimates are transmitted directly to the cloud or users in real-time to make critical decisions quickly and efficiently for analyzing repair and replacement decisions and estimating material and repair/replacement costs for building facets/roofs other damage located within and to other personal property within the property boundaries. The users can be subscribers to cloud services providing the services for example using a website phone, or other electronic device. They can be insurance companies connected to the web and cloud services supplied by the multi-media report and estimate providers. Claims decisions and desk audits can be completed based on clients 730 viewing the transmitted reports. The UAV 110 and coupled sensor payload device 120 can be deployed on quick notice to severely damaged areas while providing automated assessment reports as soon as they are deployed on-site. The host vehicle which the system is electronically tethered can be networked together to form a larger group of UAVs, to increase the speed of coverage for very large damage areas.

The assessment and reporting UAV 110 and sensor payload device 120 system may have a location interface to receive an electronic input to define and identify the location of the damage required to be reported upon. The system may convert the property address into GPS coordinates, along with the other third-party services such as roof analysis commercial providers. This data is integrated into the flight planning process so that the drone is safety flown to the location and avoids terrain, trees, antennas, and using onboard obstacle avoidance technology, objects suddenly appearing in the path of the drone on way to and from the property.

Figure 8:
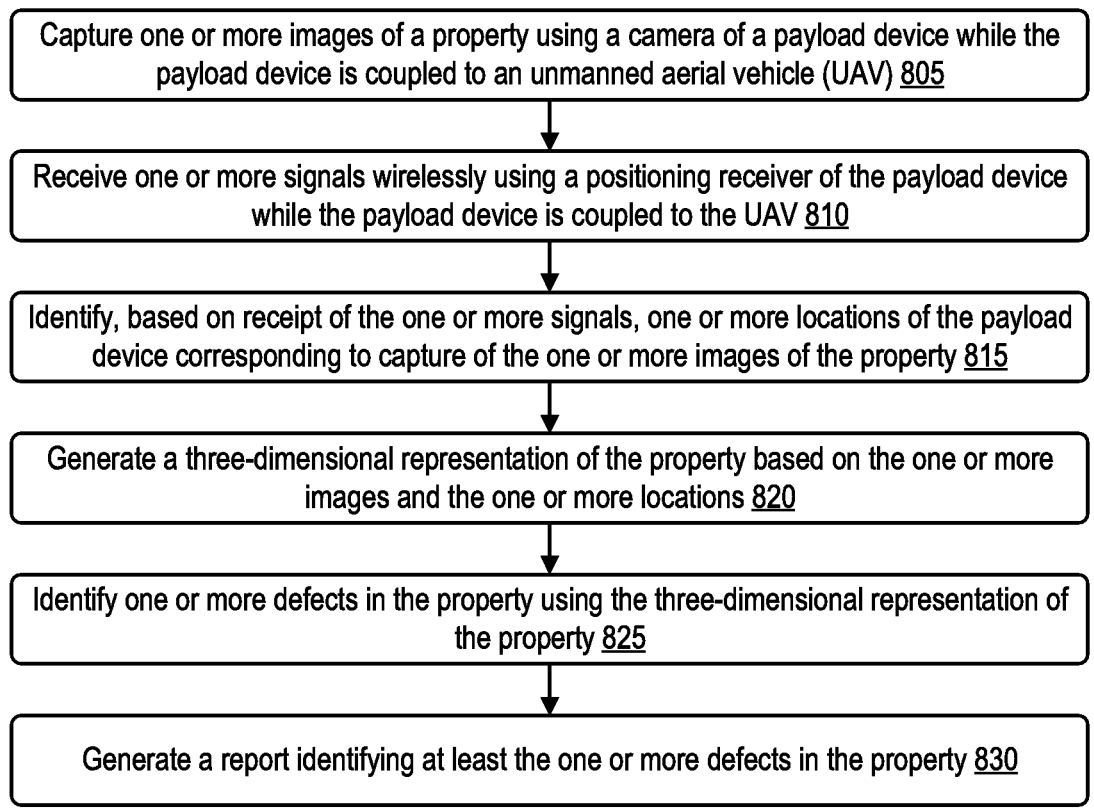
FIG. 8 is a flow diagram illustrating techniques for automated property analysis.

FIG. 8 is a flow diagram illustrating techniques for automated property analysis.

The flow diagram 800 of FIG. 8 illustrates techniques and processes executed by the sensor payload device 120 and/or the UAV 110. In some cases, certain steps may alternately or additionally be performed at least in part by the UAV 110, the user mobile 760, the base station 410/415, the server 725, or a combination thereof. The sensor payload device 120 may be referred to in some cases simply as a payload device, or as a sensor payload, or as a sensor device.

At step 805, the sensor payload device 120 captures one or more images of a property using a camera of a payload device while the sensor payload device 120 is coupled to an unmanned aerial vehicle (UAV) 110.

At step 810, the sensor payload device 120 receives one or more signals wirelessly using a positioning receiver of the payload device while the payload device is coupled to the UAV.

At step 815, the sensor payload device 120 identifies, based on receipt of the one or more signals, one or more locations of the sensor payload device 120 corresponding to capture of the one or more images of the property. The one or more signals may be positioning signals, for example, GNSS signals from GNSS satellites, cellular network signals from cellular network base stations, Bluetooth signals from Bluetooth beacons, WLAN signals from WLAN access points, or some combination thereof. The one or more locations corresponding to capture of the one or more images of the property may be one or more locations that the sensor payload device 120 was in while the sensor payload device 120 captured each of the one or more images in step 805, or within a threshold time frame of the capture of each image.

At step 820, the sensor payload device 120 generate a three-dimensional representation of the property based on the one or more images and the one or more locations. In some cases, the sensor payload device 120 may generate a texture using the one or more images, and the texture may be applied to the three-dimensional representation of the property.

At step 825, the sensor payload device 120 identifies one or more defects in the property using the three-dimensional representation of the property. In some cases, identifying one or more defects in the property using the three-dimensional representation of the property includes identifying a match between at least a portion of the three-dimensional representation of the property and one or more stored media items depicting one or more known defects. The one or more stored media assets depicting the one or more known defects may include one or more stored images depicting the one or more known defects and/or one or more stored three-dimensional models depicting the one or more known defects. In some cases, the sensor payload device 120 may identify one or more categories of defect that describe a first defect in the property of the one or more defects in the property by identifying that the one or more categories of defect are included in information associated with at least a first stored media item of the one or more stored media items, wherein identifying the match includes identifying a match between the first defect in the property and the first stored media item. Generating the report includes identifying the one or more categories of defect in the report. Defects may include manufacturing defects but may also include damage, such as damage from rain, water, snow, ice, hail, collisions, accidents, wind, tornadoes, earthquakes, fires, or combinations thereof. In some cases, a machine learning algorithm, such as a neural network, may be trained to identify defects (including damage) within the 3D model using training data that includes the stored media assets depicting the one or more known defects.

At step 830, the sensor payload device 120 generates a report identifying at least the one or more defects in the property. The report may in some cases include at least a portion of the three-dimensional representation of the property and/or one or more two-dimensional representations of the three-dimensional representation of the property, for example showing one or more defects at different angles.

To reduce insurance company and adjuster's claim investigation cycle time, reduce assessment costs, provide greater efficiencies and increased safety, UAV 110 carried computerized sensor payload devices 120 with multiple onboard computers, enhanced error corrected, real-time kinematics (RTK) enhancements and centimeter three-dimensional (3D) global positioning system (GPS) location, cameras and sensor systems can self-develop, on-site reports. The report includes detailed scoping and complete damage estimates which the drone equipped sensor payload device 120 can stream/transmit completed electronic multimedia report and documents where they are needed in real-time. In addition, depending upon the carrier specific requirements, the system can create a report tailored for a specific carrier as the system may process the requirements for the report using the advanced knowledge of which insurance carrier the claim belongs to may define the carrier requirement and the claim may be assessed based on those carrier specific requirements. The system may perform the assessment and develop reports. The report may be generated with that carrier logo and on the forms, that are currently in the systems which may be under configuration controls to insure the latest forms are used. By automating the process of determining if hail or not hail damage has been inflicted upon a roof and to what level of damage may be quickly and automatically reported to the requestor. Interface is also available through application programming interfaces (APIs) for automated settlement process, sending funds to the insured's financial institution and thereby speeding up the closing of the claim.

The report and estimates may include multimedia materials, such as media photos, videos, graphics, renderings, roof wire drawings, CAD renditions, inventory list of roofing hardware and material listings, labor estimates, detailed measurements, pitch angles specific damage media, size and GPS orientation locations, three dimensional drawings showing the % or damage in graphical form, electronic media, or by drawings showing they type and category of the damage including the geographical location, directionality of structure, roof or crops if used for crop analysis and severity. The media contained in the reports may be certified, geospatially marked with time and date stamps, including the elevation and camera angle/heading, drone unit number, operator at time of capture. Even though the camera may sometimes be in the nadir direction capturing media, it may still incorporate all he media marking including time, data, camera angle, heading and geospatial data with time and date. The camera or cameras also have a feature to allow the angle needed to capture any angle required to create the required data for the system.

Each facet may be clearly identified individually and marked with respect to the compass indicating direction, and location in relationship relative to the overall roof including relative direction to true and magnetic north. In addition, the angle and direction in degrees that the facet faces, size of the facet, the area of the facet and the damage level, pitch and or slope in angle and degrees. It may analyze and create estimates/reports/documents for repair, material and or replacement costs. Data and documents may be stored, transmit the electronic document for users, subscribers and networked cloud services while on-site. Utilizing (CAD) computer aided design tools, programs and applications, mission captured certified georeferenced precision hi-altitude structural centralized nadir located media capture points along with precision low-altitude structural image media may be loaded and processed into CAD files and converted into real-time measurement wireframes and roof facets where they may be error corrected utilizing differential and precision corrected technologies such as RTK (Real-time Kinematics).

In some cases, once the sensor payload device 120 finishes steps 805 and 810, any combination of steps 815, 820, 825, and 830 may be performed by a second device that receives the one or more images and positioning data based on or including the one or more signals. The second device may be, for example, the UAV 110, a user mobile 760, a base station 410/415, a server 725, or a combination thereof.

In some cases, the system collected media can be combined with satellite, aircraft, Google Earth data to perform digital renderings in 2D or 3D for additional features and functions. Further, math formulas may be generated by onboard CAD developed building/roof dimensions for complex geometry media that the system interprets and utilizes. In addition, the data may be used to inspect for certain types of damage to the roof. For example, in the case of hail, image comparison algorithms along with media comparison may be used to compare industry standard hail examples against the property to systematically determine the location, facet directionality, severity, impact per test area, impact bruise depth, shingle grain patterns and to create multi media reports, in including the specific location with centimeter location of each hail strike, estimates and transmit to the users, cloud, communication or networks as required electronic documents.

While the one or more images may be still images or video frames from a camera, they may also be "images" or other media from another sensor, such as point clouds from a radar sensor, a lidar sensor, a sonar/sodar sensor, a laser rangefinder, or some combination thereof.

Figure 9:
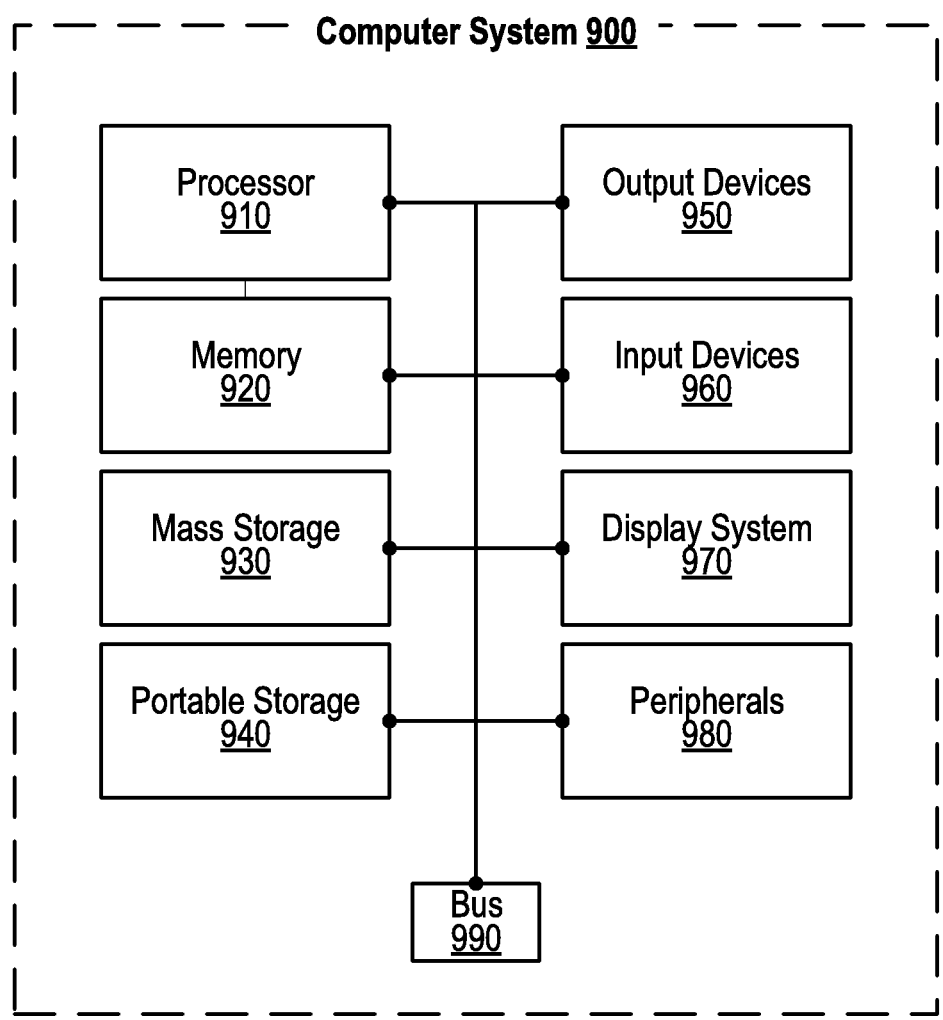
FIG. 9 is a block diagram of an exemplary computing device that may be used to implement some aspects of the subject technology.

FIG. 9 illustrates an exemplary computing system 900 that may be used to implement some aspects of the subject technology. For example, any of the UAV(s) 110, sensor payload device(s) 120, base station(s) 415, mobile device(s) 760, server(s) 725, client(s) 730, computing devices, computing systems, network devices, network systems, servers, and/or arrangements of circuitry described herein may include at least one computing system 900, or may include at least one component of the computer system 900 identified in FIG. 9. The computing system 900 of FIG. 9 includes one or more processors 910 and memory 920. Each of the processor(s) 910 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 910 may include one or more cores, either integrated onto a single chip or spread across multiple chips connected or coupled together. Memory 920 stores, in part, instructions and data for execution by processor 910. Memory 920 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 990. However, the components may be connected through one or more data transport means. For example, processor unit 910 and memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive or an optical disk drive, is a non-volatile storage device for storing data and instructions for use by processor unit 910. Mass storage device 930 can store the system software for implementing some aspects of the subject technology for purposes of loading that software into memory 920.

Portable storage device 940 operates in conjunction with a portable non-volatile storage medium, such as a floppy disk, compact disk or Digital video disc, to input and output data and code to and from the computer system 900 of FIG. 9. The system software for implementing aspects of the subject technology may be stored on such a portable medium and input to the computer system 900 via the portable storage device 940.

The memory 920, mass storage device 930, or portable storage 940 may in some cases store sensitive information, such as transaction information, health information, or cryptographic keys, and may in some cases encrypt or decrypt such information with the aid of the processor 910. The memory 920, mass storage device 930, or portable storage 940 may in some cases store, at least in part, instructions, executable code, or other data for execution or processing by the processor 910.

Output devices 950 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 970. The printer may be inkjet, laserjet, thermal, or some combination thereof. In some cases, the output device circuitry 950 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Output devices 950 may include any ports, plugs, antennae, wired or wireless transmitters, wired or wireless transceivers, or any other components necessary for or usable to implement the communication types listed above, such as cellular Subscriber Identity Module (SIM) cards.

Input devices 960 may include circuitry providing a portion of a user interface. Input devices 960 may include an alpha-numeric keypad, such as a keyboard, for inputting alpha-numeric and other information, or a pointing device, such as a mouse, a trackball, stylus, or cursor direction keys. Input devices 960 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, wireless local area network (WAN) signal transfer, cellular data network wireless signal transfer, personal area network (PAN) signal transfer, wide area network (WAN) signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 960 may include any ports, plugs, antennae, wired or wireless receivers, wired or wireless transceivers, or any other components necessary for or usable to implement the communication types listed above, such as cellular SIM cards.

Input devices 960 may include receivers or transceivers used for positioning of the computing system 900 as well. These may include any of the wired or wireless signal receivers or transceivers. For example, a location of the computing system 900 can be determined based on signal strength of signals as received at the computing system 900 from three cellular network towers, a process known as cellular triangulation. Fewer than three cellular network towers can also be used—even one can be used—though the location determined from such data may be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 900 such as a router, modem, switch, hub, bridge, gateway, or repeater. These may also include Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 960 may include receivers or transceivers corresponding to one or more of these GNSS systems.

Display system 970 may include a liquid crystal display (LCD), a plasma display, an organic light-emitting diode (OLED) display, an electronic ink or "e-paper" display, a projector-based display, a holographic display, or another suitable display device. Display system 970 receives textual and graphical information, and processes the information for output to the display device. The display system 970 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 980 may include any type of computer support device to add additional functionality to the computer system. For example, peripheral device(s) 980 may include one or more additional output devices of any of the types discussed with respect to output device 950, one or more additional input devices of any of the types discussed with respect to input device 960, one or more additional display systems of any of the types discussed with respect to display system 970, one or more memories or mass storage devices or portable storage devices of any of the types discussed with respect to memory 920 or mass storage 930 or portable storage 940, a modem, a router, an antenna, a wired or wireless transceiver, a printer, a bar code scanner, a quick-response ("QR") code scanner, a magnetic stripe card reader, a integrated circuit chip (ICC) card reader such as a smartcard reader or a EUROPAY®-MASTERCARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

The components contained in the computer system 900 of FIG. 9 can include those typically found in computer systems that may be suitable for use with some aspects of the subject technology and represent a broad category of such computer components that are well known in the art. That said, the computer system 900 of FIG. 9 can be customized and specialized for the purposes discussed herein and to carry out the various operations discussed herein, with specialized hardware components, specialized arrangements of hardware components, and/or specialized software. Thus, the computer system 900 of FIG. 9 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 900 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 900 may also use a Basic Input/Output System (BIOS) or Unified Extensible Firmware Interface (UEFI) as a layer upon which the operating system(s) are run.

In some cases, the computer system 900 may be part of a multi-computer system that uses multiple computer systems 900, each for one or more specific tasks or purposes. For example, the multi-computer system may include multiple computer systems 900 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 900 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 920, the mass storage 930, the portable storage 940, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L9), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 910 for execution. A bus 990 carries the data to system RAM or another memory 920, from which a processor 910 retrieves and executes the instructions. The instructions received by system RAM or another memory 920 can optionally be stored on a fixed disk (mass storage device 930/portable storage 940) either before or after execution by processor 910. Various forms of storage may likewise be implemented as well as the necessary network interfaces and network topologies to implement the same.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 900 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A payload device that is distinct from an unmanned aerial vehicle (UAV) and that is configured to be used with the UAV interchangeably with at least one other payload device, the payload device comprising:
   a housing that is distinct from the UAV and that changes between an uncoupled state and a coupled state, wherein the UAV and the housing are physically uncoupled in the uncoupled state, wherein the UAV and the housing are removably physically coupled in the coupled state;
   a first coupling mechanism of the housing, wherein the housing removably physically couples to the UAV in the coupled state using a second coupling mechanism of the UAV that removably physically directly connects to the first coupling mechanism of the housing, wherein the first coupling mechanism of the housing and the second coupling mechanism of the UAV are uncoupled in the uncoupled state;
   a positioning receiver within the housing, wherein the positioning receiver wirelessly receives one or more signals and generates positioning information based on the one or more signals while the housing is removably physically coupled to the UAV in the coupled state;
   a camera at least partially within the housing, the camera capturing one or more images of a property while the housing is removably physically coupled to the UAV in the coupled state;
   a first battery that is within the housing and that is distinct from a second battery of the UAV, wherein, while the housing is removably physically coupled to the UAV in the coupled state, the first battery provides power to at least the positioning receiver, the camera, an avionics controller, and a processor;

a first landing mechanism that is coupled to the housing and that is distinct from a second landing mechanism of the UAV;

a memory within the housing, the memory storing first instructions and second instructions;

the avionics controller that is within the housing and distinct from any controller of the UAV, the avionics controller executing the first instructions while the housing is removably physically coupled to the UAV in the coupled state, wherein execution of the first instructions causes the avionics controller to:

identify, based on the positioning information, one or more locations of the positioning receiver along a flight path about at least a portion of the property corresponding to capture of the one or more images of the property, update the flight path of the UAV about at least the portion of the property to generate navigation information based on at least a subset of the positioning information, and send the navigation information to the UAV to control the UAV to fly the flight path after updating the flight path; and the processor that is within the housing and distinct from any processor of the UAV, the processor executing the second instructions while the housing is removably physically coupled to the UAV in the coupled state, wherein execution of the second instructions causes the processor to:

generate a three-dimensional representation of the property based on the one or more images and the one or more locations, identify one or more defects of the property using the three-dimensional representation of the property, and generate a report identifying at least the one or more defects of the property.

2. The payload device of claim 1, wherein identifying the one or more defects of the property using the three-dimensional representation of the property includes identifying a match between at least a portion of the three-dimensional representation of the property and one or more stored media assets depicting one or more known defects.

3. The payload device of claim 2, wherein execution of the second instructions causes the processor that is within the housing to further identify one or more categories of defect that describe a first defect in the property of the one or more defects of the property by identifying that the one or more categories of defect are included in information associated with at least a first stored media asset of the one or more stored media assets, wherein identifying the match includes identifying a match between the first defect in the property and the first stored media asset, wherein generating the report includes identifying the one or more categories of defect in the report.

4. The payload device of claim 2, wherein the one or more stored media assets depicting the one or more known defects include one or more stored images depicting the one or more known defects.

5. The payload device of claim 2, wherein the one or more stored media assets depicting the one or more known defects include one or more stored three-dimensional models depicting the one or more known defects.

6. The payload device of claim 1, further comprising a range detection sensor that detects one or more distances between the UAV and one or more portions of the property, wherein generating the three-dimensional representation of the property is also based on the one or more distances.

7. The payload device of claim 1, wherein execution of the second instructions causes the processor that is within the housing to further:

generate a texture for the three-dimensional representation of the property based on the one or more images of the property, and apply the texture to the three-dimensional representation of the property, wherein identifying the one or more defects of the property uses the three-dimensional representation of the property with the texture applied.

8. The payload device of claim 1, wherein execution of the second instructions causes the processor that is within the housing to further:

generate a key pair comprising a private key and a public key, generate a hash digest of a first image of the one or more images, encrypt the hash digest using the private key, generate an encrypted digital signature that includes the hash digest encrypted using the private key, verify that the first image is genuine by decrypting the encrypted digital signature using the public key to retrieve the hash digest and by verifying that the hash digest corresponds to a newly generated hash digest of the first image; and transmit the public key.

9. The payload device of claim 8, wherein execution of the second instructions causes the processor that is within the housing to further:

encrypt metadata associated with the first image with the private key, wherein the encrypted digital signature also includes metadata.

10. The payload device of claim 1, wherein generating the three-dimensional representation of the property is based on one or more above-ground images of the one or more images, the one or more above-ground images depicting an above-ground portion of the property, wherein the three-dimensional representation of the property includes a representation of the above-ground portion of the property.

11. The payload device of claim 1, wherein generating the three-dimensional representation of the property is based on one or more underground images of the one or more images, the one or more underground images depicting an underground portion of the property, wherein the three-dimensional representation of the property includes a representation of the underground portion of the property.

12. The payload device of claim 1, wherein the housing removably couples to the second coupling mechanism of the UAV using the first coupling mechanism at a point along a flight path of the UAV, wherein the point is after a start of the flight path and before an end of the flight path.

13. The payload device of claim 1, wherein execution of the first instructions causes the avionics controller of the payload device to:

generate the flight path about at least the portion of the property based on at least one of: the positioning information, the one or more images of the property, or the three-dimensional representation of the property; and transmit the flight path to the UAV to cause the UAV to fly along the flight path.

14. The payload device of claim 1, wherein, in the coupled state, a first electrical connector of the first coupling mechanism of the housing and a second electrical connector of the second coupling mechanism of the UAV are coupled to one another, wherein the avionics controller is coupled to send the navigation information to the UAV through the first electrical connector and the second electrical connector while the first electrical connector and the second electrical connector are coupled to one another in the coupled state.

15. The payload device of claim 1, wherein, in the coupled state, a first electrical connector of the first coupling mechanism of the housing and a second electrical connector of the second coupling mechanism of the UAV are coupled to one another, wherein power is conveyed between the first battery and a second battery of the UAV through the first electrical connector and the second electrical connector while the first electrical connector and the second electrical connector are coupled to one another in the coupled state.

16. The payload device of claim 1, wherein the avionics controller is configured to control at least one motor of the UAV based on the sending of the navigation information to the UAV to control the UAV to fly the flight path after updating the flight path.

17. A method for automated property analysis using a payload device that is distinct from an unmanned aerial vehicle (UAV) and that is configured to be used with the UAV interchangeably with at least one other payload device, the method comprising:
removably physically coupling a housing of the payload device and the UAV using a first coupling mechanism of the housing and a second coupling mechanism of the UAV, wherein the housing is distinct from the UAV, wherein the UAV and the housing are removably physically coupled and the first coupling mechanism is removably physically directly connects to the second coupling mechanism in a coupled state, wherein the UAV and the housing are physically uncoupled and the first coupling mechanism is physically uncoupled from the second coupling mechanism in an uncoupled state;
providing power from a first battery within the housing of the payload device to at least a camera of the payload device and a positioning receiver of the payload device and an avionics controller of the payload device and a processor of the payload device while the housing of the payload device is removably physically coupled to the UAV, wherein the first battery is distinct from a second battery of the UAV, and wherein the housing at least partially includes the first battery, the camera, the positioning receiver, the avionics controller, and the processor;
capturing one or more images of a property using the camera that is at least partially within the housing of the payload device while the housing of the payload device is removably physically coupled to the UAV in the coupled state;
receiving one or more signals wirelessly using a positioning receiver that is at least partially within the housing of the payload device while the housing of the payload device is removably physically coupled to the UAV in the coupled state;
generating positioning information based on the one or more signals using the positioning receiver while the housing is removably physically coupled to the UAV in the coupled state; and
executing first instructions using the avionics controller of the payload device that is distinct from any controller of the UAV, wherein the avionics controller executes the first instructions while the housing is removably physically coupled to the UAV in the coupled state, wherein execution of the first instructions causes the avionics controller to:
identify, based on the positioning information, one or more locations of the payload device along a flight path about at least a portion of the property corresponding to capture of the one or more images of the property,
update the flight path of the UAV about at least the portion of the property to generate navigation information based on at least a subset of the positioning information and sending the navigation information to the UAV, and
send the navigation information to the UAV to control the UAV to fly the flight path after updating the flight path;
executing second instructions using the processor of the payload device that is distinct from any processor of the UAV, wherein the processor of the payload device executes the second instructions while the housing is removably physically coupled to the UAV in the coupled state, wherein execution of the second instructions causes the processor to:
generate a three-dimensional representation of the property based on the one or more images and the one or more locations,
identify one or more defects of the property using the three-dimensional representation of the property, and
generate a report identifying at least the one or more defects of the property; and
landing the payload device and the UAV using a first landing mechanism of the payload device that is distinct from a second landing mechanism of the UAV while the housing of the payload device is removably physically coupled to the UAV in the coupled state.

18. The method of claim 17, wherein identifying the one or more defects of the property using the three-dimensional representation of the property includes identifying a match between at least a portion of the three-dimensional representation of the property and one or more stored media items depicting one or more known defects.

19. The method of claim 18, further comprising identifying one or more categories of defect that describe a first defect in the property of the one or more defects of the property by identifying that the one or more categories of defect are included in information associated with at least a first stored media item of the one or more stored media items, wherein identifying the match includes identifying a match between the first defect in the property and the first stored media item, wherein generating the report includes identifying the one or more categories of defect in the report.

20. The method of claim 18, wherein the one or more stored media items depicting the one or more known defects include one or more stored images depicting the one or more known defects.

21. The method of claim 18, wherein the one or more stored media items depicting the one or more known defects include one or more stored three-dimensional models depicting the one or more known defects.

22. The method of claim 17, further comprising receiving one or more distances between the UAV and one or more portions of the property measured by a range detection sensor of the payload device, wherein generating the three-dimensional representation of the property is also based on the one or more distances.

23. The method of claim 17, further comprising:
generating a texture for the three-dimensional representation of the property based on the one or more images of the property, and
applying the texture to the three-dimensional representation of the property, wherein identifying the one or more defects of the property uses the three-dimensional representation of the property with the texture applied.

24. The method of claim 17, further comprising:
generating a key pair comprising a private key and a public key,
generating a hash digest of a first image of the one or more images,
encrypting the hash digest using the private key,
generating an encrypted digital signature that includes the hash digest encrypted using the private key,
verifying that the first image is genuine by decrypting the encrypted digital signature using the public key to retrieve the hash digest and by verifying that the hash digest corresponds to a newly generated hash digest of the first image; and
transmitting the public key.

25. The method of claim 24, further comprising encrypting metadata associated with the first image with the private key, wherein the encrypted digital signature also includes the encrypted metadata.

26. A non-transitory computer readable storage medium having embodied thereon a program for automated property analysis using a payload device that is distinct from an unmanned aerial vehicle (UAV) and that is configured to be used with the UAV interchangeably with at least one other payload device, wherein the program is executable by a processor to perform a method comprising:
removably physically coupling a housing of the payload device and the UAV using a first coupling mechanism of the housing and a second coupling mechanism of the UAV, wherein the housing is distinct from the UAV, wherein the UAV and the housing are removably physically coupled and the first coupling mechanism is removably physically directly connects to the second coupling mechanism in a coupled state, wherein the UAV and the housing are physically uncoupled and the first coupling mechanism is physically uncoupled from the second coupling mechanism in the uncoupled state;
providing power from a first battery within the housing of the payload device to at least a camera of the payload device and a positioning receiver of the payload device and an avionics controller of the payload device and a processor of the payload device while the housing of the payload device is removably physically coupled to the UAV, wherein the first battery is distinct from a second battery of the UAV, and wherein the housing at least partially includes the first battery, the camera, the positioning receiver, the avionics controller, and the processor;
capturing one or more images of a property using the camera that is at least partially within the housing of the payload device while the housing of the payload device is removably physically coupled to the UAV in the coupled state;
receiving one or more signals wirelessly using a positioning receiver that is at least partially within the housing of the payload device while the housing of the payload device is removably physically coupled to the UAV in the coupled state;
generating positioning information based on the one or more signals using the positioning receiver while the housing is removably physically coupled to the UAV in the coupled state;
identifying, by the avionics controller of the payload device and based on the positioning information, one or more locations of the payload device along a flight path about at least a portion of the property corresponding to capture of the one or more images of the property, wherein the avionics controller of the payload device is distinct from any controller of the UAV;
updating, by the avionics controller of the payload device, the flight path of the UAV about at least the portion of the property to generate navigation information based on at least a subset of the positioning information and sending the navigation information to the UAV;
sending, by the avionics controller of the payload device, the navigation information to the UAV to control the UAV to fly the flight path after updating the flight path;
generating, by the processor of the payload device, a three-dimensional representation of the property based on the one or more images and the one or more locations, wherein the processor of the payload device is distinct from any processor of the UAV;
identifying, by the processor of the payload device, one or more defects of the property using the three-dimensional representation of the property;
generating, by the processor of the payload device, a report identifying at least the one or more defects of the property, and
land the payload device and the UAV using a first landing mechanism of the payload device that is distinct from a second landing mechanism of the UAV while the housing of the payload device is removably physically coupled to the UAV in the coupled state.

* * * * *